(12) United States Patent
Kuhn et al.

(10) Patent No.: US 11,833,776 B2
(45) Date of Patent: Dec. 5, 2023

(54) CROSS-LAMINATED TIMBER PANEL HAVING A CONDUIT THEREIN AND ATTACHABLE FITTING

(71) Applicants: Tyler Valentine Kuhn, Spokane, WA (US); Michael Ryan Bradley, Spokane, WA (US); Michael J Kuhn, Spokane, WA (US)

(72) Inventors: Tyler Valentine Kuhn, Spokane, WA (US); Michael Ryan Bradley, Spokane, WA (US); Michael J Kuhn, Spokane, WA (US)

(73) Assignee: Four Sided Solutions LLC, Spokane, WA (US)

( * ) Notice: Subject to any disclaimer, the term of this patent is extended or adjusted under 35 U.S.C. 154(b) by 0 days.

(21) Appl. No.: 17/398,981

(22) Filed: Aug. 10, 2021

(65) Prior Publication Data

US 2021/0370634 A1     Dec. 2, 2021

Related U.S. Application Data

(63) Continuation-in-part of application No. 16/243,711, filed on Jan. 9, 2019, now Pat. No. 11,084,245.

(51) Int. Cl.
    *B32B 3/02*           (2006.01)
    *B32B 3/14*           (2006.01)
    (Continued)

(52) U.S. Cl.
    CPC ............. *B32B 3/02* (2013.01); *B32B 3/14* (2013.01); *B32B 3/18* (2013.01); *B32B 3/20* (2013.01);
    (Continued)

(58) Field of Classification Search
None
See application file for complete search history.

(56) References Cited

U.S. PATENT DOCUMENTS

| | | | |
|---|---|---|---|
| 4,252,470 A | * | 2/1981 | Sluys ................. E02B 3/064 |
| | | | 114/263 |
| 5,109,898 A | | 5/1992 | Schacht |

(Continued)

FOREIGN PATENT DOCUMENTS

| | | |
|---|---|---|
| AU | 2020206671 | 7/2020 |
| BE | 1024499 | 3/2018 |

(Continued)

OTHER PUBLICATIONS

Machine Translation of JP-01169038-A, Jul. 1989 (Year: 1989).*

(Continued)

*Primary Examiner* — Jeffrey A Vonch
(74) *Attorney, Agent, or Firm* — Farrell Patent Law PC; Mark Farrell

(57) ABSTRACT

A fitting attachable to a cross-laminated panel provides a chase, plumbing space, airflow duct, or wiring route on an edge of the cross-laminated panel. The fitting may run between edges of multiple cross-laminated panels that contain integral hollow members, forming a customizable network of contiguous coplanar routing paths, accessible without installing pipes and wires behind, or in front of the cross-laminated panels. The fitting may also provide a vertical chase for single or multiple cross-laminated panels. The fitting takes advantage of one or more hollow members in the cross-laminated panels to provide contiguous routing paths for wires, pipes, and venting within the cross-laminated panels themselves, extending across any layout of multiple cross-laminated panels. The fitting may additionally serve as mechanical support for attachment of adjacent panels. Further, the fitting may provide structural connection (Continued)

for the CLT panels as required to meet structural code requirements for the building.

23 Claims, 20 Drawing Sheets

(51) Int. Cl.

| | | |
|---|---|---|
| *B32B 3/18* | (2006.01) | |
| *B32B 3/20* | (2006.01) | |
| *B32B 3/24* | (2006.01) | |
| *B32B 7/12* | (2006.01) | |
| *B32B 21/04* | (2006.01) | |
| *B32B 21/13* | (2006.01) | |
| *B32B 21/14* | (2006.01) | |
| *E04C 2/12* | (2006.01) | |
| *E04C 2/24* | (2006.01) | |
| *E04C 2/52* | (2006.01) | |
| *B32B 3/26* | (2006.01) | |
| *B32B 5/12* | (2006.01) | |
| *E04B 1/10* | (2006.01) | |
| *E04B 1/70* | (2006.01) | |
| *B32B 15/04* | (2006.01) | |
| *B32B 15/08* | (2006.01) | |
| *B32B 15/10* | (2006.01) | |
| *B32B 15/14* | (2006.01) | |
| *B32B 7/03* | (2019.01) | |
| *B32B 5/26* | (2006.01) | |
| *B32B 3/08* | (2006.01) | |
| *B32B 3/10* | (2006.01) | |
| *B32B 38/04* | (2006.01) | |
| *B32B 37/14* | (2006.01) | |
| *B32B 37/12* | (2006.01) | |
| *B32B 37/02* | (2006.01) | |
| *B32B 37/10* | (2006.01) | |
| *B27M 3/00* | (2006.01) | |
| *B32B 3/06* | (2006.01) | |

(52) U.S. Cl.
CPC ............... *B32B 3/266* (2013.01); *B32B 5/12* (2013.01); *B32B 7/12* (2013.01); *B32B 21/04* (2013.01); *B32B 21/042* (2013.01); *B32B 21/13* (2013.01); *B32B 21/14* (2013.01); *E04C 2/12* (2013.01); *E04C 2/24* (2013.01); *E04C 2/521* (2013.01); *E04C 2/525* (2013.01); *B27K 2200/30* (2013.01); *B27K 2240/20* (2013.01); *B27K 2240/30* (2013.01); *B27M 3/0026* (2013.01); *B27M 3/0086* (2013.01); *B32B 3/06* (2013.01); *B32B 3/08* (2013.01); *B32B 3/10* (2013.01); *B32B 5/26* (2013.01); *B32B 7/03* (2019.01); *B32B 15/043* (2013.01); *B32B 15/08* (2013.01); *B32B 15/10* (2013.01); *B32B 15/14* (2013.01); *B32B 37/02* (2013.01); *B32B 37/10* (2013.01); *B32B 37/12* (2013.01); *B32B 37/1207* (2013.01); *B32B 37/14* (2013.01); *B32B 37/142* (2013.01); *B32B 38/04* (2013.01); *B32B 2038/047* (2013.01); *B32B 2250/03* (2013.01); *B32B 2250/05* (2013.01); *B32B 2250/40* (2013.01); *B32B 2250/42* (2013.01); *B32B 2307/102* (2013.01); *B32B 2307/304* (2013.01); *B32B 2307/3065* (2013.01); *B32B 2307/50* (2013.01); *B32B 2307/764* (2013.01); *B32B 2317/16* (2013.01); *B32B 2398/00* (2013.01); *B32B 2419/00* (2013.01); *B32B 2419/06* (2013.01); *B32B 2607/00* (2013.01); *Y10T 428/24008* (2015.01); *Y10T 428/24058* (2015.01); *Y10T 428/24132* (2015.01); *Y10T 428/24182* (2015.01); *Y10T 428/24322* (2015.01); *Y10T 428/24331* (2015.01); *Y10T 428/24744* (2015.01); *Y10T 428/24777* (2015.01)

(56) References Cited

U.S. PATENT DOCUMENTS

| | | | |
|---|---|---|---|
| 10,870,990 B1 * | 12/2020 | Mueller | H02G 3/22 |
| 2008/0034706 A1 * | 2/2008 | Preiss | E04B 2/703 |
| | | | 52/784.11 |
| 2013/0136886 A1 | 5/2013 | Dagesse | |
| 2017/0002579 A1 * | 1/2017 | French | E04C 2/523 |
| 2018/0073248 A1 | 3/2018 | Derleth | |
| 2019/0186122 A1 * | 6/2019 | Patterson | E04B 1/10 |
| 2020/0215784 A1 * | 7/2020 | Kuhn | B32B 13/12 |
| 2020/0299962 A1 * | 9/2020 | Espinosa | B32B 7/08 |
| 2021/0123237 A1 | 4/2021 | Lang | |

FOREIGN PATENT DOCUMENTS

| | | | | |
|---|---|---|---|---|
| BE | 1024499 B1 * | 3/2018 | | B32B 5/18 |
| CA | 2256257 A1 * | 6/2000 | | E04B 2/7457 |
| CA | 2872041 | 11/2012 | | |
| CA | 3133142 | 7/2020 | | |
| CN | 105926830 A * | 9/2016 | | B32B 5/18 |
| CN | 108162519 A | 6/2018 | | |
| DE | 1035880 B * | 8/1957 | | B27D 1/06 |
| DE | 2148585 A * | 4/1972 | | E04B 1/10 |
| DE | 9207654 U1 * | 10/1992 | | E04B 1/10 |
| DE | 29622260 U1 * | 2/1997 | | E04C 2/12 |
| DE | 19834616 A1 * | 2/2000 | | E04B 1/10 |
| DE | 202013001756 U1 * | 3/2013 | | |
| DE | 202013001756 U1 * | 5/2013 | | E04C 2/12 |
| DE | 102014013420 A1 * | 3/2016 | | B32B 21/04 |
| EP | 560013 A1 * | 9/1993 | | E04B 1/10 |
| EP | 564675 A1 * | 10/1993 | | B27M 3/0086 |
| EP | 1995387 A2 * | 11/2008 | | E04B 1/10 |
| EP | 2390433 A1 * | 11/2011 | | |
| EP | 2636809 | 9/2013 | | |
| EP | 3409855 A1 * | 12/2018 | | |
| EP | 3908714 | 11/2021 | | |
| FR | 2240089 A * | 4/1975 | | B27D 1/06 |
| FR | 2604655 A * | 4/1988 | | E04C 2/52 |
| FR | 2922565 A1 * | 4/2009 | | E04B 1/90 |
| FR | 2925082 A1 * | 6/2009 | | E04B 1/10 |
| GB | 2542199 | 3/2017 | | |
| GB | 2542199 A * | 3/2017 | | E04B 1/7608 |
| JP | 01169038 A * | 7/1989 | | |
| JP | 03091011 U * | 9/1991 | | B27M 3/0086 |
| JP | 06229069 A * | 6/1994 | | E04C 2/12 |
| JP | 08199839 A * | 8/1996 | | |
| JP | 11200533 A * | 7/1999 | | |
| JP | 2000013964 A * | 1/2000 | | |
| JP | 2002256636 A * | 9/2002 | | |
| JP | 2003184273 A * | 7/2003 | | |
| JP | 2003291114 A * | 10/2003 | | |
| JP | 2003293517 A * | 10/2003 | | |
| JP | 2003306994 A * | 10/2003 | | |
| JP | 2004232245 A * | 8/2004 | | |
| JP | 2004276296 A * | 10/2004 | | |
| JP | 2004285710 A * | 10/2004 | | |
| JP | 2006328664 A * | 12/2006 | | |
| JP | 2019173275 | 10/2019 | | |
| JP | 2019173275 A * | 10/2019 | | E04B 1/34315 |
| JP | 2022517348 | 3/2022 | | |
| WO | WO-2008025312 A1 * | 3/2008 | | B32B 21/13 |
| WO | WO-2012134331 A1 * | 10/2012 | | E04B 2/88 |
| WO | WO-2013190498 A1 * | 12/2013 | | B27F 1/02 |
| WO | WO-2014016752 A2 * | 1/2014 | | E04B 1/10 |
| WO | WO-2019218217 A1 * | 11/2019 | | |

(56) References Cited

FOREIGN PATENT DOCUMENTS

WO     WO-2020065198 A1 *   4/2020   ......... E04B 1/34315
WO     WO/2020/146210       7/2020

OTHER PUBLICATIONS

Machine Translation of JP-08199839-A, Aug. 1996 (Year: 1996).*
Machine Translation of JP-2000013964-A, Jan. 2000 (Year: 2000).*
Campbell, Integrating Structure, Systems, and Space: CLT + Steel, Aug. 2016, Dalhousie Graduate Studies Online Theses, <http://hdl.handle.net/10222/72099> (Year: 2016).*
Machine Translation of WO-2020065198-A1, Apr. 2020 (Year: 2020).*
The PCT Search Report and Written Opinion dated Apr. 1, 2020, for parent patent application PCT Application No. PCT/US2020/012217, 8 pages.
Extended European Search Report, dated Aug. 16, 2022 for EP3908714—a Nat. Phase application of parent app: PCT Application No. PCT/US2020/012217, 10 pages.

* cited by examiner

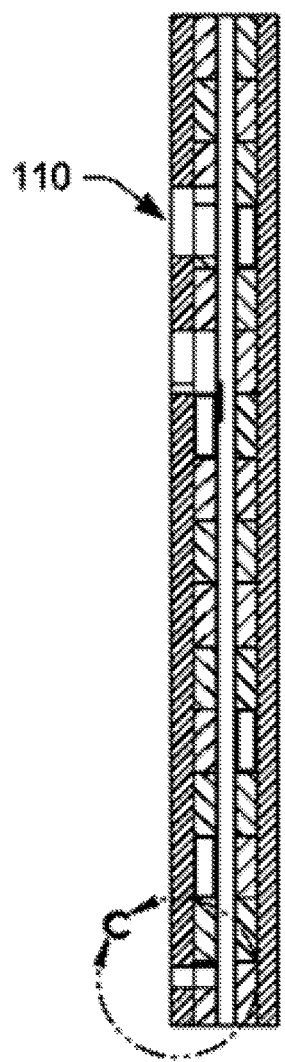
SECTION B-B
FIG. 2D
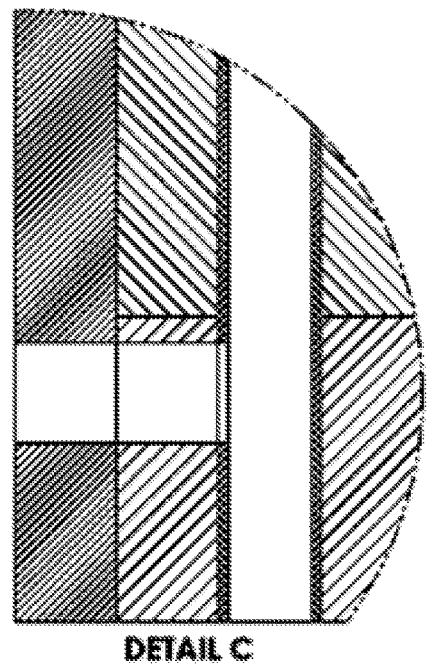
DETAIL C
FIG. 2E
FIG. 4

CROSS-LAMINATED TIMBER PANEL HAVING A CONDUIT THEREIN AND ATTACHABLE FITTING

CROSS-REFERENCE TO RELATED APPLICATION

This continuation-in-part patent application claims the benefit of priority to U.S. patent application Ser. No. 16/243,711 to Kuhn et al., filed Jan. 9, 2019, now U.S. Pat. No. 11,084,245 to Kuhn et al., issued Aug. 10, 2021, which is incorporated herein by reference in its entirety.

BACKGROUND

Mass timber is growing in popularity and interest due to the structural performance, aesthetics, and opportunity for innovation. Mass timber is strong, sustainable, and relatively cost-efficient. Cross-laminated timber (CLT) is one type of mass timber that is receiving growing attention in the construction industry. CLT is a solid wood panel made from several layers of lumber board, stacked and glued on their wide faces. Described herein are improvements and technological advances that, among other things, improve usability of CLT for construction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

FIG. 2D illustrates a cross-sectional view of the cross-laminated timber panel taken along line B-B in FIG. 2A.

FIG. 2E illustrates a detail view (shown by circle C) of the cross-sectional view of the cross-laminated timber panel in FIG. 2C.

DETAILED DESCRIPTION

Overview

Figure 1:
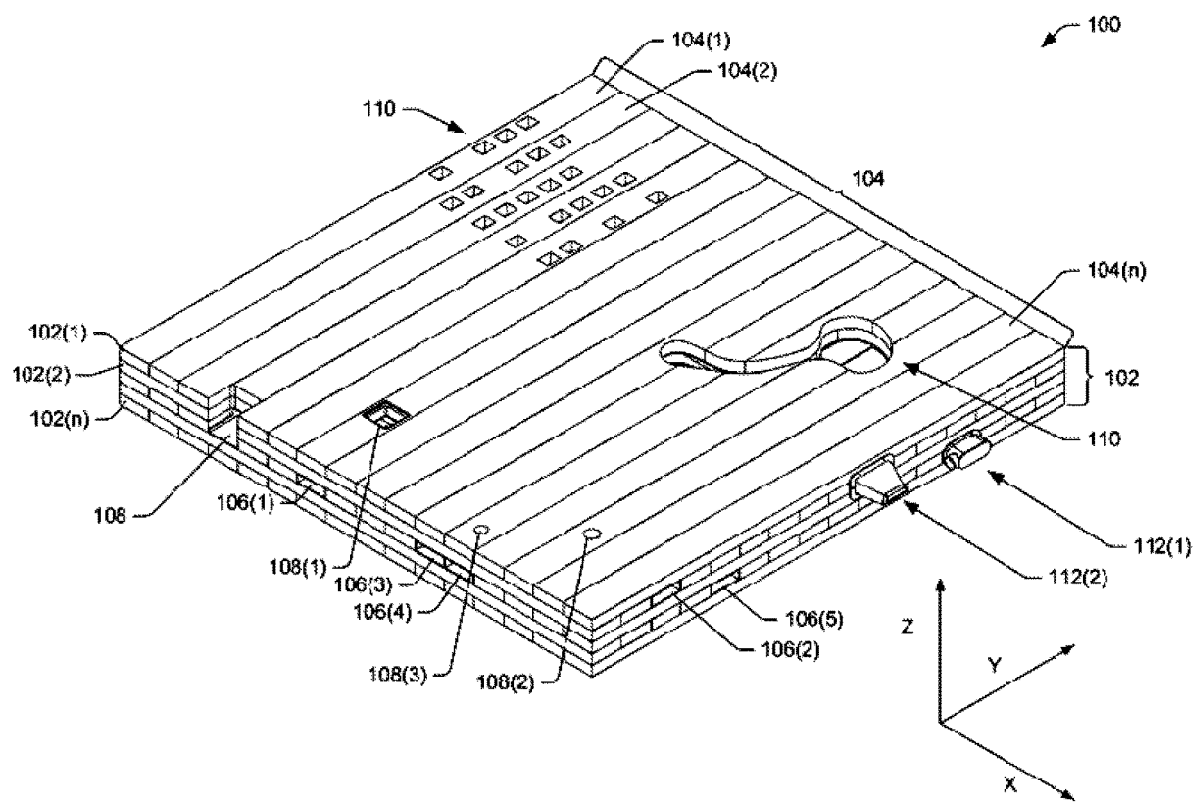
FIG. 1 illustrates a perspective view of an example cross-laminated timber panel.

A fitting attachable to a cross-laminated panel provides a chase, plumbing space, airflow duct, or wiring route on an edge of the cross-laminated panel. The fitting may run between edges of multiple cross-laminated panels that contain integral hollow members, forming a customizable network of contiguous coplanar routing paths, accessible without installing pipes and wires in front of or behind the cross-laminated panels. The fitting may also provide a vertical chase for single or multiple cross-laminated panels. The fitting takes advantage of one or more hollow members in the cross-laminated panels to provide contiguous routing paths for wires, pipes, and venting within the cross-laminated panels themselves, extending across any layout of multiple cross-laminated panels.

Example Embodiments

As described previously, cross-laminated timber (CLT) panels may be implemented in a variety of different applications due to the strength, sustainability, and cost-efficiency that the CLT panels provide. CLT panels are diverse and may be implemented to construct an entire building, including both vertical and lateral load resisting systems, and/or CLT panels may be used for particular building elements such as walls, floors, or roofs. This disclosure is directed to a cross-laminated timber panel having a conduit therein. More specifically, this disclosure describes a CLT panel including a hollow member that is included as part of the CLT panel that may provide a conduit for cabling, air, plumbing, etc. CLT provides many advantages over other construction alternatives. For example, CLT panels may be manufactured offsite and CLT panels may utilize lower grade timber (which may be less expensive and more sustainable than higher grade timber), while maintaining structural integrity.

However, traditional Light Wood Frame (LWF) construction provides easier means to route electrical cables and ducts transversely through the walls. This is due to the fact that CLT panels are comprised of solid material. Therefore, routing channels are often drilled through the CLT panel, cut into the surface of the CLT panel, or external exposed conduits may be utilized. However, this adds additional expense and labor in the field. Furthermore, transverse cuts in an outer layer of a CLT panel may greatly reduce the strength and bending resistance of the panel. Other solutions may include leaving out one or more members of the CLT panel during manufacture, thus leaving a void as a conduit. However, this too is problematic for modern manufacturing methods that implement hydraulic or mechanical clamping and pressing.

In examples, the CLT panel may include multiple layers of boards stacked crosswise and glued together on their wide faces. For example, a first layer of the CLT panel may include multiple boards, each oriented in a first direction. That is to say, a length of each board may extend in the first direction. The CLT panel may include a second layer that is adjacent to the first layer. The second layer may also include boards, each oriented in a second direction. In these examples, the second direction may be different than the first direction and, in examples, the second direction may be substantially perpendicular to the first direction. The CLT panel may include further layers, such that each additional layer may alternate directions between the first direction and the second direction. In other examples, one or more of the layers may be disposed in the same direction to each other and may not alternate directions. It should be understood that while the boards are described herein as being glued together on their wide faces, the boards may additionally, or alternatively, be glued on their narrow faces and/or one more edges of the individual boards.

Furthermore, the CLT panel may include adhesive that may be applied between each layer of the CLT panel. As mentioned previously, the boards may be adhered to one another on their wide faces and/or their narrow faces. The CLT panel may also include one or more hollow members in at least one of the layers. In examples, the hollow members may take the place of boards in at least one of the layers of the CLT panel. The hollow members may provide a conduit through which cables, wiring, air, plumbing, etc. may pass.

Additional details of these and other examples are described below with reference to the drawings.

FIG. 1 depicts a perspective view of a cross-laminated timber (CLT) panel 100, according to an embodiment. As mentioned previously, the CLT panel 100 may include multiple layers 102 of boards 104 stacked crosswise and glued together on their wide faces. For example, the CLT panel 100 depicted in FIG. 1 includes five layers 102, each layer (102(1), 102(2), . . . 102(n)) including multiple boards 104. While FIG. 1 depicts the CLT panel 100 as having five layers, it is to be understood that the CLT panel 100 may include any number of layers 102. For example, the CLT panel may include 2, 3, 4, 5, 7, 9, etc. layers. Additionally, and/or alternatively, each layer (102(1), 102(2), . . . 102(n)) of the multiple layers 102 may include any number of boards 104. As shown in FIG. 1, the multiple boards 104 included in a single layer are all oriented in a same direction. For example, a first layer 102(1) may include first boards oriented such that a length of each board (104(1), 104(2), . . . 104(n)) extends in a first direction (that is the Y direction). In examples, the multiple boards 104 may include any type of wood material. While this description refers to the panel as a CLT panel it is to be understood that, in examples, the multiple boards 104 may include polymers, metals, composites, etc.

As described previously, the CLT panel 100 may include a second layer 102(2) of multiple boards 104 (or "second boards"). As shown in FIG. 1, the second layer 102(2) may be immediately adjacent to the first layer 102(1). In examples, the second layer 102(2) may include second boards oriented such that a length of each board of the second boards extends in a second direction. In such an example, the second direction may be different than the first direction. In the example shown in FIG. 1, the second layer 102(2) may include second boards that are oriented in a second direction that is substantially perpendicular relative to the first boards in the first layer 102(1) oriented in the first direction. In examples the term "substantially perpendicular" may include the first direction is at a 90-degree angle relative to the second direction, the first direction is at an angle between about 85 degrees and about 95 degrees relative to the second direction, or the first direction is at an angle between about 80 and about 100 degrees relative to the second direction. Still further, in examples, a CLT panel may include layers oriented at any angle relative to one another. Additionally, and/or alternatively, the CLT panel 100 may include adjacent layers having multiple boards oriented in a same or similar direction. As shown in FIG. 1, the CLT panel 100 may include multiple layers oriented such that each adjacent layer alternates between the first direction and the second direction. In examples, two or more of the layers may be oriented such that each adjacent layer does not alternate directions but instead is oriented in the same direction.

In examples, the CLT panel 100 may include adhesive (not shown) that may be applied to the multiple boards 104 between the layers 102 of the CLT panel 100. Such an adhesive may include at least one of phenolic types (such as phenol-resorcinal formaldehyde (PRF)), emulsion polymer isocyanate (EPI), and/or one-component polyurethane (PUR), among others. As mentioned previously, the adhesive may be applied to a wide face of the multiple boards 104. For example, a single board of the multiple boards may include a thickness, a width, and a length and the adhesive may be applied to the width of the board. In some examples, the thickness may be a narrow face of the board; however, in other examples, the thickness may be equal to the width of the board.

Additionally, in examples, the CLT panel 100 may include one or more hollow members 106 (also referred to herein as "spacer boards") included in at least one of the layers 102. As shown in FIG. 1, the CLT panel 100 may include multiple hollow members 106 disposed in multiple layers 102. In examples, the one or more hollow members 106 may be sized and/or configured as a conduit in each of the layers 102 that the one or more hollow members 106 are disposed. For example, the one or more hollow members 106 may provide a conduit through which cables, wiring, air, plumbing, etc. may pass. In examples, the one or more hollow members 106 may eliminate the need for pipes, ducts, etc. For example, the one or more hollow members 106 may provide a conduit through which fluids and/or gases may pass. Additionally, the one or more hollow members 106 may eliminate and/or reduce the need to attach external conduits/ducts to the outside of the CLT panel 100. Furthermore, placing one or more hollow members 106 in at least one of the layers 102 may reduce and/or eliminate the need to rout and/or bore the panel to receive electrical conduit, plumbing pipes, and/or mechanical chases, thus reducing on site and/or post production labor. In examples, the one or more hollow members 106 may include coatings and/or materials on an exterior and/or interior that provide insulation, fire-resistance, anti-bacterial compounds, etc.

In examples, the one or more hollow members 106 may have substantially similar outside dimensions as the multiple boards 104. That is to say, the one or more hollow members 106 may include substantially similar lengths, widths, and/or heights as the multiple boards 104. In such examples, the one or more hollow members 106 may be constructed such that the one or more hollow members 106 are free from any external protrusions. Additionally, and/or alternatively, the one or more hollow members 106 may include larger or smaller outside dimensions relative to the multiple boards 104. In examples, the one or more hollow members 106 may include varying inside dimensions. However, in examples, the one or more hollow members 106 may include substantially similar inside dimensions to one another. For example, the one or more hollow members 106 may be constructed with specific inside dimensions to accommodate certain materials, cables, fluids, etc. In examples, the one or more hollow members 106 may have first outside dimensions and/or first inside dimensions when constructed as an electrical conduit and the one or more hollow members may have second outside dimensions and/or second inside dimensions when constructed as an air duct. In examples, the hollow member may have a wall thickness and/or may be made of a material sufficient to withstand a clamping force and/or a pressing force during manufacture of the device. The wall thickness may be, for example, between about 0.1 centimeters to about 2 centimeters. The one or more hollow members 106 may be constructed of metal, plastic, or carbon fiber, or any hybrid material thereof. In examples, the hollow member may be constructed with adequate rigidity and/or strength to resist forces and temperature subjected thereto as a result of clamping and pressing during manufacture of the CLT panel. In such an example, the strength properties of the hollow member may be designed based at least in part on a specific manufacturing process. Additionally, and/or alternatively, the one or more hollow members 106 may be constructed of any material having at least one of substantially similar elastic properties as wood, substantially similar strength properties as wood, and/or substantially similarity mechanical properties as wood. In examples, the one or more hollow members 106 may be constructed of specific materials for a specific application of the one or more hollow members 106. For example, the one or more hollow members may be constructed of a first material (e.g., a polymer) when constructed as an electrical conduit and/or the one or more hollow members may be constructed of a second material (e.g., a metal) when constructed as an air duct. Additionally, and/or alternatively, the one or more hollow members 106 may be constructed of a same and/or similar material in any and/or all applications.

The one or more hollow members 106 may be disposed substantially equidistant throughout at least one of the layers 102. This could be considered a default spacing. For example, a hollow member 106 may be placed after every third board in a layer 102(*n*). In such an example, the default spacing (or equidistance) between hollow members may benefit a contractor updating or remodeling a structure including CLT panels. Much like stud spacing, a contractor would be able to rely on the fact that a hollow member is placed at known intervals throughout a layer and/or layers in a CLT panel. However, the one or more hollow members 106 may be placed according to a desired design for the CLT panel 100. For example, a CLT panel may be designed to include hollow members based on a specific building design. In another example, a CLT panel may include two hollow members disposed adjacent to one another. Still further, a CLT panel may include hollow members that are randomly arranged throughout the CLT panel. Furthermore, the CLT panel may include a hole or an access point 108 where one hollow member intersects and/or overlaps another hollow member. For example, as shown in FIG. 1, the first layer 102(1) includes an access point 108 disposed at a location where a first hollow member 106(1) disposed in the third layer 102(3) overlaps a second hollow member 106(2) in the second layer 102(2). Such a hole 108 may allow a contractor to access the one or more hollow members 106 that may be one or more layers deep in the CLT panel 100. This may also allow a contractor to change routing from the X direction to the Y direction. Additionally, and/or alternatively, the CLT panel 100 may include an access point located anywhere in a layer to allow access to an underlying hollow member 106.

In examples, the CLT panel 100 may include venting port(s) 110. The venting ports 110 may act as an air register or grille to allow air to flow therethrough. In examples, the access points 108 and the venting ports 110 may be included as part of the manufacture process of the CLT panel 100 or the access points 108 and the venting ports 110 may be machined into the CLT panel 100 after production. These ports could be arranged to be a cosmetic pattern with some of the ports residing in a location accessing the hollow member, while some of the ports are solely to provide the continuation of the cosmetic design and do not correspond to a hollow member location. Additionally, and/or alternatively, the CLT panel 100 may include one or more windows, doors, etc. disposed in the CLT panel that may also be included as part of the manufacture process of the CLT panel 100 or may be machined into the CLT panel 100 post-production.

Furthermore, the one or more hollow members 106 may include one or more fittings 112 attached thereto. For example, a given hollow member of the one or more hollow members 106 may include a first end, a second end, and a fitting 112 attached to at least one of the first end or the second end. In examples, the hollow member may include an electrical fitting 112(1) or a duct fitting 112(2). An electrical fitting 112(1) may be attached to the hollow member 106, or alternatively to CLT material (e.g., the boards of the CLT panel) adjacent to the hollow member 106, to rout one or more of cables, wires, etc. therethrough. A duct fitting 112(2) may be attached to the hollow member 106, or to the CLT material adjacent to the hollow member 106, to allow passage of air therethrough. The interface may be gasketed in order to seal the connection. Additionally, and/or alternatively, the one or more hollow members 106 may include other types of fittings for mechanical chases. In examples, an electrical fitting may be constructed of a material different than a duct fitting. For example, an electrical fitting may be constructed of a polymer, while a duct fitting may be constructed of a metal. Additionally, and/or alternatively, an electrical fitting may be constructed of a same and/or similar material as a duct fitting. It should be understood that the fittings 112 as described herein may span multiple proximate hollow members 106.

Additionally, in examples, the CLT panel 100 may include an intermediate layer (not shown). The intermediate layer may act as a type of barrier, structural support, insulation, etc. For example, the intermediate layer may include at least one of acoustic insulation, gypsum board, fire retardant, insecticide, thermal insulation, etc. In examples, the adhesive may be applied to the intermediate layer to adhere the intermediate layer to the layers 102. Additionally, and/or alternatively, the CLT panel may include one or more outside layers attached to the outer layer of the CLT panel. In examples, hollow members may be included in the intermediate layer in the same or a similar manner as the placement of hollow members as described elsewhere herein.

Figure 2A:
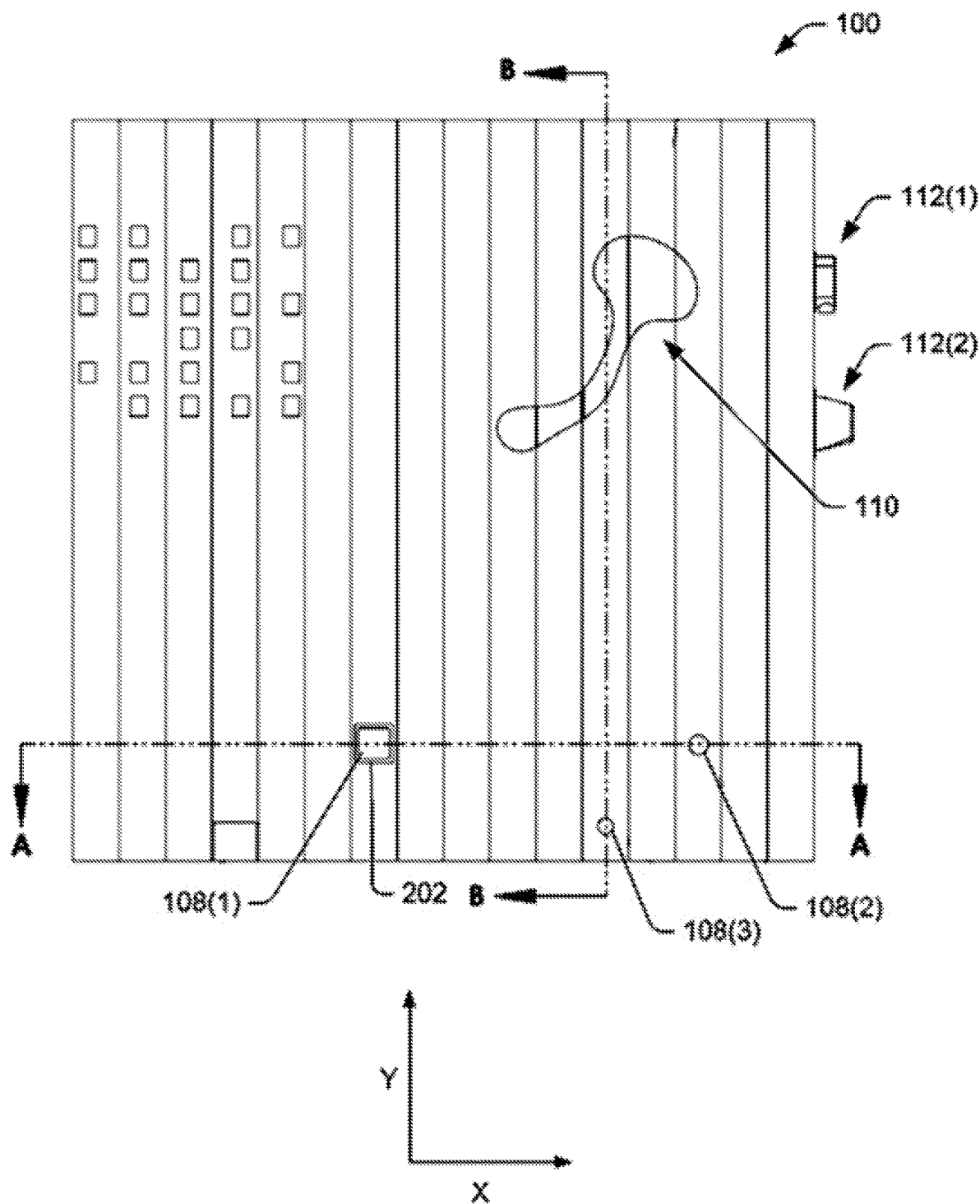
FIG. 2A illustrates a front view of an example cross-laminated timber panel.

FIG. 2A depicts a front view of the CLT panel 100. Depicted in FIG. 2A are cross section lines A-A and B-B. In examples, the CLT panel 100 in FIG. 2A may be oriented such that a bottom portion of the CLT panel 100 is positioned at the bottom of the Y axis and a top portion of the CLT panel 100 is positioned at the top of the Y axis. In such an example, the bottom portion of the CLT panel 100 may be connected to a floor of a structure and/or another CLT panel and the top portion may be connected to a ceiling of a structure and/or another CLT panel. In examples, the CLT panel 100 may be connected to other CLT panels in the X direction. Additionally, and/or alternatively, the CLT panel 100 may be connected to other mass timber structures (e.g., glue-laminated timber, nail-laminated timber, etc.), metal structures, wood structures, etc. The CLT panel 100 may be connected to other structures and/or panels via any fastening means or system. By way of example, the CLT panel 100 may be fastened to other structures and/or panels via at least one of glued-in rods, epoxied shear connectors, mechanical fasteners (e.g., nails, screws, glulam rivets, dowels, bolts, etc.), bearing-type fasteners (e.g., split rings, shear plates, etc.), etc. In examples, the CLT panel 100 may be fastened to other structures and/or panels via any fastener that comports with design specification in the region that the CLT panel may be used. For example, fasteners may be selected based on the approved fasteners set forth in the National Design Specification (NDS) for Wood Construction.

In examples, the CLT panel 100 may include a width that extends in the Y direction and a length that extends in the X direction. The width of the CLT panel may be up to about 8 feet or more wide and may be up to about 40 feet or more long. In some examples, the CLT panel 100 may be constructed to any specific dimensions greater than and/or less than the dimensions given above depending on placement in a structure.

Figure 2B:
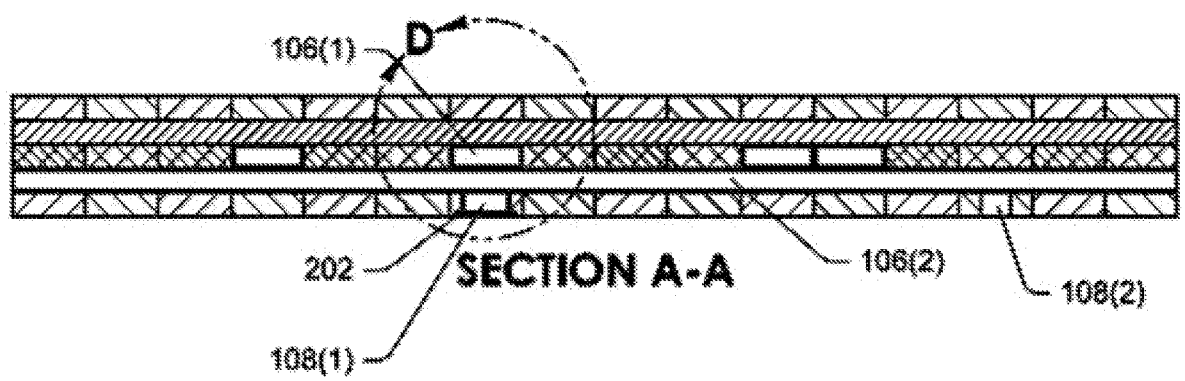
FIG. 2B illustrates a cross-sectional view of the cross-laminated timber panel taken along line A-A in FIG. 2A.
Figure 2C:
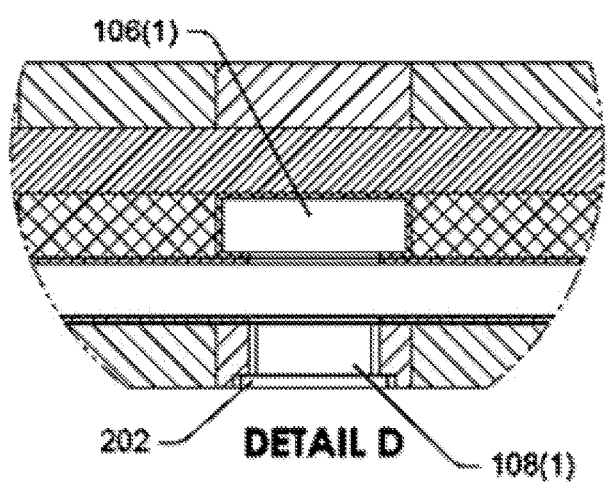
FIG. 2C illustrates a detail view (shown by circle D) of the cross-sectional view of the cross-laminated timber panel in FIG. 2B

FIG. 2B depicts a cross-sectional view of the CLT panel in FIG. 2A taken along line A-A. FIG. 2B depicts a first access point 108(1) as shown in FIG. 2A. The first access point 108(1) may include an electrical box 202 disposed within the first access point 108(1). This is depicted in greater detail in FIG. 2C. The first access point 108(1) may be disposed where the first hollow member 106(1) overlaps the second hollow member 106(2). FIG. 2B also depicts a second access point 108(2) disposed in the first layer of the CLT panel. FIG. 2B depicts additional hollow members that may be disposed throughout the CLT panel. In examples, each layer of the CLT panel may include a thickness. For example, a single layer of the CLT panel may be about 1 and ⅜ inches thick. However, in examples, a single layer of the CLT panel may include a thickness between about ⅝ inches to about 2 inches thick. The CLT panel may include layers having a thickness less than about ⅝ inches and/or greater than about 2 inches in some examples. Furthermore, the CLT panel may include a total thickness of up to about 20 inches thick. As mentioned previously, the CLT panel may include adjacent layers that are oriented in opposite directions and/or may include adjacent layers that are oriented in same directions. For example, the CLT panel may include a configuration of at least one of 3-ply 3-layer, 5-ply 5-layer, 6-ply 5-layer, 9-ply 9-layer, 5-ply 3-layer, 7-ply 5-layer, 8-ply 5-layer, 9-ply 7-layer, and/or any other configuration.

As mentioned previously, FIG. 2C depicts an electrical box 202 disposed within the first access point 108(1). The electrical box 202 may house one or more electrical components. For example, an electrical box included in the CLT panel may house at least one of an outlet, an electrical panel, electrical fixtures, etc. In examples, the electrical box 202 may be disposed in an outside layer of the CLT panel so as to provide access to the electrical box 202 once the CLT panel is installed.

FIG. 2D depicts a cross-sectional view of the CLT panel in FIG. 2A taken along line B-B. FIG. 2D shows a vent portion 110 as shown in FIG. 2A. In examples, the vent portion 110 may be constructed for specific design purposes. For example, a vent portion 110 may be constructed in the CLT panel to receive a grille. However, in other examples, the vent portion 110 may be designed to act as the grille itself. Still further, in examples, the vent portion may be constructed to any specific size and/or shape. In examples, the vent portion 110 (or access points, ports, holes, etc.) may be formed during the manufacturing process and/or after the manufacturing process. As mentioned previously, each layer of the CLT panel may be about 1 and ⅜ inches thick. However, in examples, a single layer of the CLT panel may include a thickness between about ⅝ inches to about 2 inches thick. Furthermore, the CLT panel may include a total thickness of up to about 20 inches thick.

FIG. 2E depicts another example of an access point that is formed through multiple layers of the CLT panel to access a hollow member. In examples, access points disposed in the CLT panel may be constructed for specific design purposes. These access points may vary in shape and/or size. For example, a relatively small access point may be disposed in the CLT panel for mounting a light fixture thereto allowing passage of electrical wiring from the hollow member to the light fixture. However, in another example, a relatively large access point may be disposed in the CLT panel for mounting a television or other large features. In examples, access points, vent portions, etc. may be manufactured in the CLT panel by a computer numerical control (CNC) machine during or after production of the CLT panel. Additionally, and/or alternatively, access points, vent portions, etc. may be manufactured in the CLT panel by any other means (e.g., drilling by a human user, machine and/or human sawing, etc.)

Figure 3:
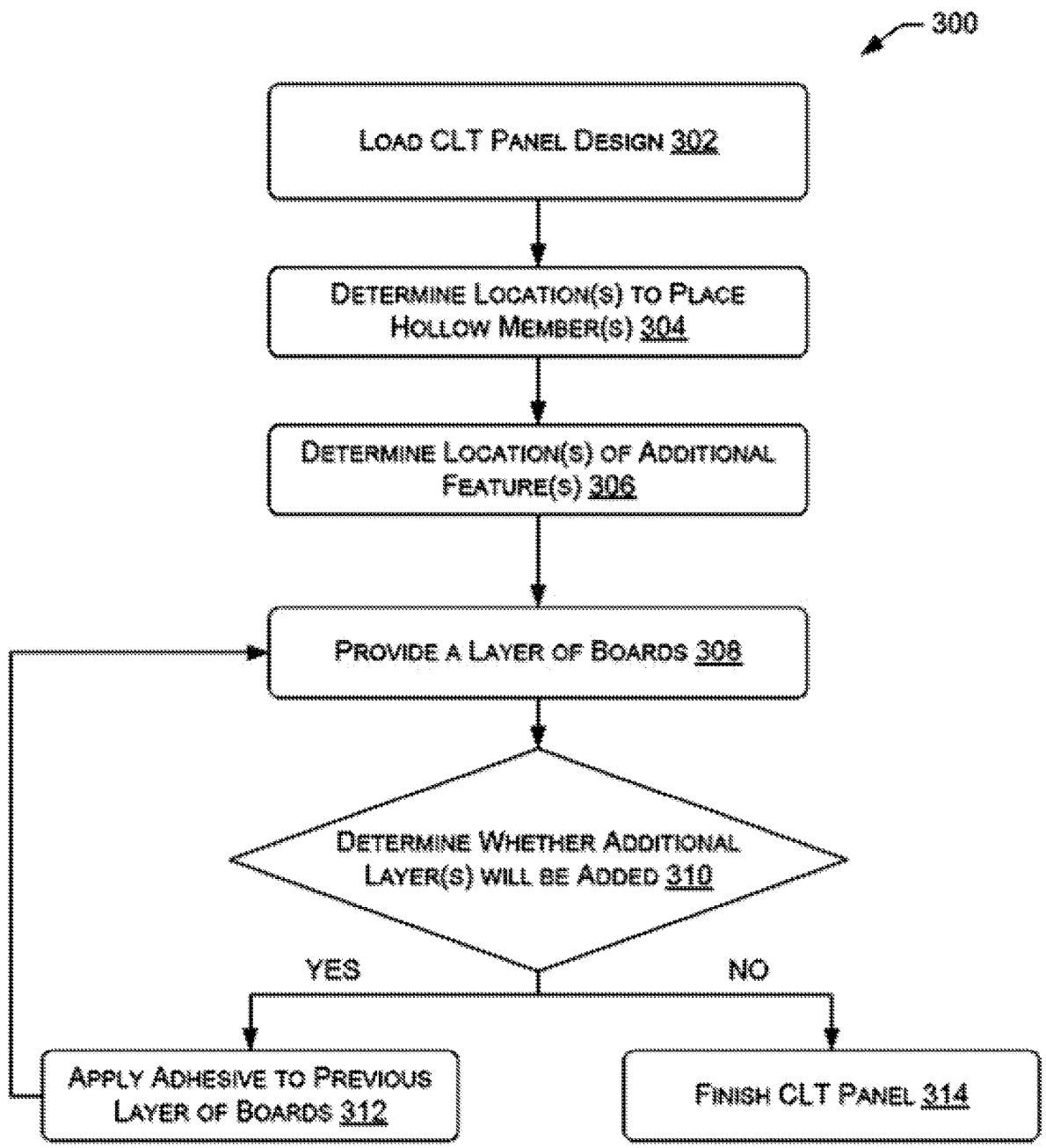
FIG. 3 is a flowchart illustrating an example process of manufacturing a cross-laminated timber panel.

FIG. 3 illustrates an example process 300 of manufacturing a cross-laminated timber (CLT) panel. For ease of explanation, the process 300 is described as being performed at least in part by a machine that is configured to complete the process 300 described herein. While this figure describes the machine performing/controlling this process, in examples, any one and/or all of the steps in the process may be completed by at least one human user.

The example manufacture process 300 (as well as each process described herein) is illustrated as a logical flow graph, each operation of which represents a sequence of operations that can be implemented by hardware, software, human users, or a combination thereof. In the context of software, the operations represent computer-executable instruction stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROM), random access memories (RAM), EPROMS, EEPROMS, flash memory, magnetic or optical cards, solid-state memory devices, or other types of storage media suitable for storing electronic instructions. In addition, in examples the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, an apparatus may load (or determine) a cross-laminated timber (CLT) panel design. For example, the apparatus may load CLT panel blueprint data. The blueprint (or design) may include information regarding the dimensions of the CLT panel and individual layers therein, locations and dimensions of hollow member(s) to be included in the CLT panel, locations and dimensions of other features (e.g., access points, electrical boxes, windows, etc.), types of materials to be used for certain portions of the CLT panel (e.g., individual boards in each layer, hollow members, electrical boxes, etc.), among other information.

At 304, the apparatus may determine, based at least in part on the CLT panel design data, a location or multiple locations to place one or more hollow members in the CLT panel. During step 304 of the process, the apparatus may determine where to place one or more hollow members in each layer of the CLT panel. As mentioned previously, this may include determining whether to place hollow members equidistant from one another ("default spacing") throughout a layer and/or the CLT panel, whether to place hollow members randomly throughout the layer and/or the CLT panel, or in a predetermined location specific to a building design or specification throughout the layer and/or the CLT panel, etc. Furthermore, at 304, the apparatus may also determine the type of material to use for each hollow member that may be included in the CLT panel. Such a determination may be based at least in part on the intended use of each hollow member in the CLT panel. For example, if a first hollow member is to be used as an air duct in the CLT panel, the apparatus may select a metallic hollow member, while if a second hollow member is to be used as an electrical conduit the apparatus may select a polymer hollow member. However, in examples, the apparatus may select hollow members constructed of other materials (e.g., polymer, organic material, composite, metal, etc.). Additionally, and/or alternatively, the apparatus may select hollow members including a same and/or similar material to use throughout the CLT panel. The hollow member selection could also be selected based on the size of the typical members used in the construction of a particular layer of the CLT panel.

At 306, the apparatus may determine, based at least in part on the CLT panel design data, a location or multiple locations of additional features to place throughout the CLT panel. Such additional features may include (but are not limited to) at least one of access points, recesses for electrical boxes, electrical boxes, holes, vents, grilles, recesses for covers and grills, doors, windows, etc. In examples, at least a portion of the features included in the CLT panel may be milled, cut, drilled, etc. after the CLT panel has been manufactured. In such examples, these processes may be included during a finishing step (described further herein below). If a hollow member is exposed via a cut in the CLT panel to provide a door or window for a building or any cut, the hollow member could be resealed or capped using a gasketed plate or cover. This cover or plate would once again seal the hollow member so that, for one example, air would not escape the channel where not desired.

At 308, the apparatus may provide a layer of boards (including one or more hollow members). In examples, the apparatus may select and provide boards and/or hollow members individually until a complete layer is provided. However, in examples, a complete layer may be laid up prior to the manufacturing process 300 such that the apparatus may transfer a complete layer from a waiting position to a lay-up position. In such examples, human users may lay out multiple boards and/or hollow members to construct a complete layer. In either example, the one or more hollow members may be laid out according to their determined positions from step 304. In examples, the multiple boards and/or hollow members may be primed prior to being provided at step 308. Such priming may include, but is not limited to, sanding, washing, finger jointing, drying, removing defects, etc. In examples, the CLT panel may be constructed of lower grade timber compared to typical hollow wall light-weight frame construction. For example, the CLT panel may be constructed of timber that is lower grade and/or different dimension when compared to typical 2×4's, 2×6's, etc. The increased strength and redundancy of a CLT panel allows the construction to be of lower grade and/or smaller dimension lumber, which, in turn, may reduce the overall cost of constructing a structure.

At 310, the apparatus may determine, based at least in part on the design data, whether an additional layer is to be added.

If it is determined at 310 that additional layers are to be added to the CLT panel, at 312 the apparatus may apply adhesive to the previous layer. As mentioned previously, the adhesive may be applied to the wide face of the boards and/or hollow members included in the previous layer. Such an adhesive may include, but is not limited to, at least one of phenolic types (such as phenol-resorcinal formaldehyde (PRF)), emulsion polymer isocyanate (EPI), and/or one-component polyurethane (PUR), among others.

After the adhesive is applied at 312, the process may repeat steps 308 and 310 until an entire CLT panel is completed. The apparatus may repeat steps 308-312 as many times as necessary. As mentioned previously, the CLT panel may be constructed of two or more layers. In examples, the CLT panel may be constructed of an odd number of layers (i.e., 3 layers, 5 layers, 7 layers, etc.). However, in examples, the CLT panel may be constructed of any number of layers. Such layers may include additional boards and/or hollow members. Additionally, and/or alternatively, additional layers may include intermediate layers described above with respect to FIG. 1.

At step 310, if it is determined that no additional layers are to be added to the CLT panel, the apparatus may finish the CLT panel at step 314. The finishing step 314 may include at least one of cutting, sanding, pressing, clamping, drilling, milling, routing, sawing, inspecting, testing, etc. It is at step 314, that features may be added that may not be included during the manufacture process steps 302-312.

Figure 4:
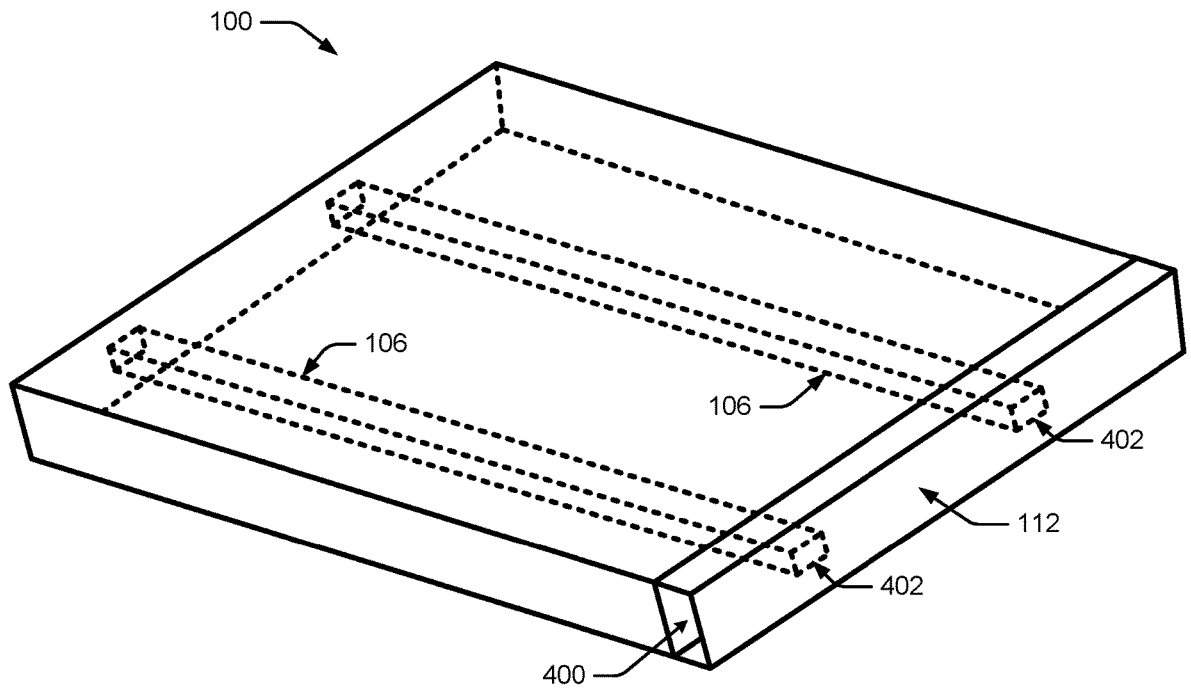
FIG. 4 is a diagram of a fitting providing a chase for hollow members of a cross-laminated panel, attachable to an edge of the cross-laminated panel.
Figure 4:
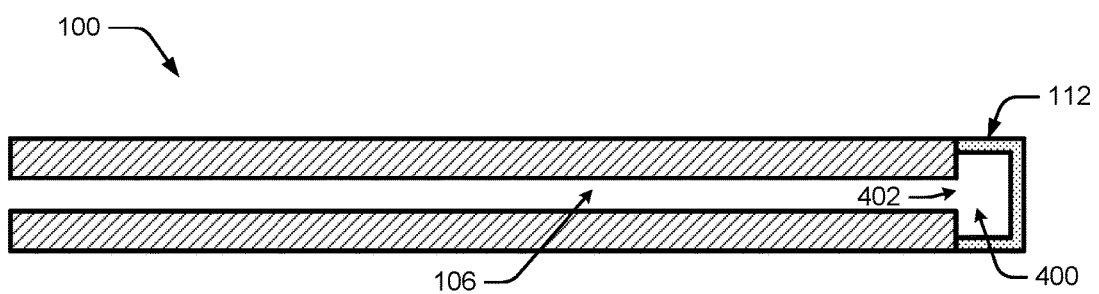

FIG. 4 shows another embodiment of a fitting 112 according to the description above for FIG. 1. In FIG. 1, the electrical fitting 112(1) is attached to the hollow member 106, or alternatively to CLT material (e.g., the boards of the CLT panel 100) adjacent to the hollow member 106, to route one or more of cables, wires, etc. Or, a duct fitting 112(2) in FIG. 1 is attached to the hollow member 106, or to the CLT material adjacent to the hollow member 106, to allow passage of air. The interface between a fitting 112 and a hollow member 106 or between the fitting 112 and the CLT material (e.g., boards) may be gasketed in order to seal the connection. As introduced in the description of FIG. 1, the one or more hollow members 106 may utilize other types of fittings 112 for mechanical chases.

In FIG. 4, the example fitting 112 is attachable to an edge of a cross-laminated panel 100 (i.e., "cross-laminated timber (CLT) panel 100"). The example fitting 112 creates a chase or a space for a wiring run along the edge of the cross-laminated panel 100.

By comparison, the electrical fitting 112(1) of FIG. 1 may be constructed of a material different than a duct fitting 112(2). For example, the electrical fitting 112(1) of FIG. 1 may be constructed of a polymer, while the duct fitting 112(2) of FIG. 1 may be constructed of a metal. Or the electrical fitting 112(1) may be constructed of a same and/or similar material as the duct fitting 112(2). It was pointed out in the description for FIG. 1 that the fittings 112 as described herein may span multiple proximate hollow members 106.

The example fitting 112 shown in FIG. 4 spans multiple hollow members 106 of the cross-laminated panel 100, providing a chase 400, routing space, or duct for wires or airflow from the hollow members 106. The hollow members 106 may reside in any layer of boards of the cross-laminated panel 100. The fitting 112 of FIG. 4 provides the chase 400 or wiring path ("run") for hollow members 106 that have openings 402 (at their ends) on the same edge of the cross-laminated panel 100 that the fitting 112 is attached to. The openings 402 on the ends of the hollow members 106 are in communication with the chase 400 or the wiring run of the fitting 112 to provide a continuous hollow routing path, made up of the contiguous hollow bores of the hollow members 106 and the hollow bore of the chase 400 of the fitting 112. The fitting 112 may extend at least between respective openings 402 of the hollow members 106, at respective ends of the hollow members 106 on the edge of the cross-laminated panel 100. Or, as shown in FIG. 4, the fitting 112 may run or extend an entire length of the edge of the cross-laminated panel 100. Regardless of the length or extent of the fitting 112 on an edge of the cross-laminated panel 100, the fitting 112 allows a change of direction of utility (wires, airflow, plumbing, and so forth) without utilizing hollow members 106 running in a different direction than the hollow members 106 utilized by the fitting 112. The hollow members 106 running in different directions reside in various other layers of the cross-laminated panel 100 (with their own openings 402 on other edges of the cross-laminated panel 100). It should be noted that the hollow members 106 not covered by the fitting 112 of FIG. 4 may be covered by a different instance of the fitting 112 on a different edge of the cross-laminated panel 100. Similarly, the hollow members 106 running in different directions within the interior of the cross-laminated panel 100 may achieve routing paths in multiple directions and dimensions via passages between the hollow members 106 within the cross-laminated panel 100, as described in U.S. Pat. No. 11,084,245 to Kuhn et al, incorporated herein by reference in its entirety.

Figure 5:
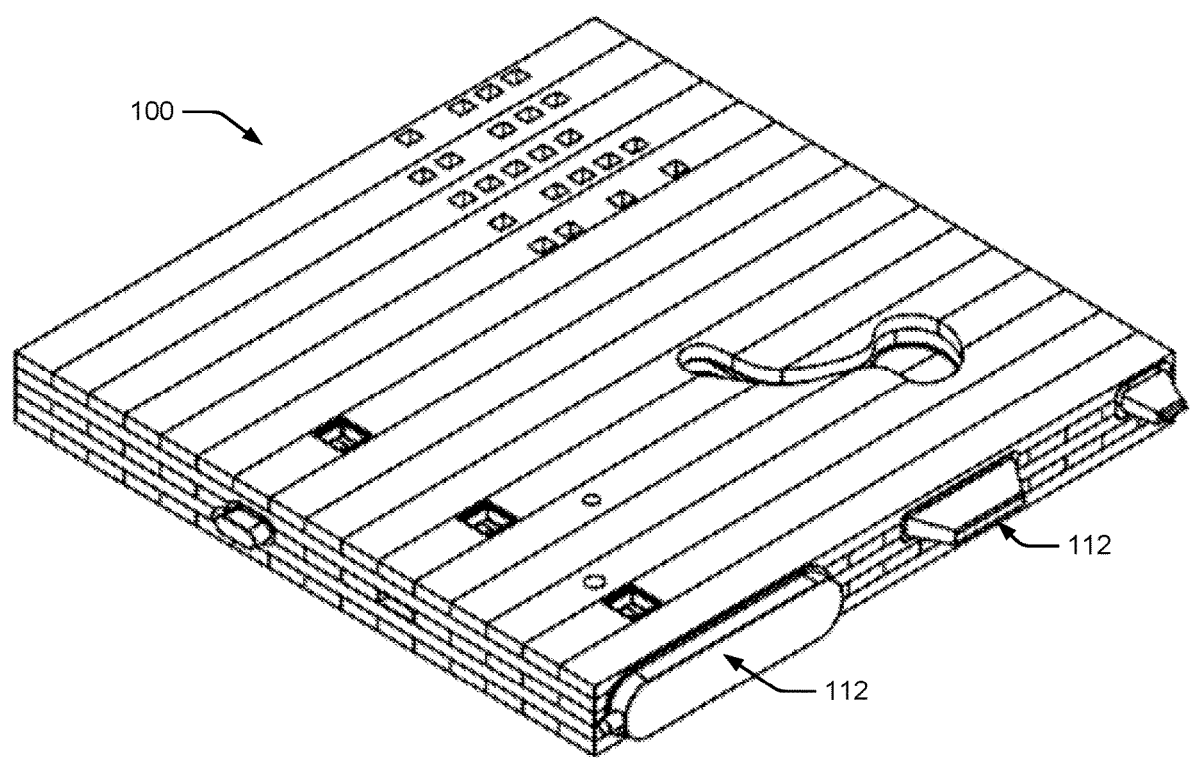
FIG. 5 is a diagram of other example embodiments of a fitting providing a chase for hollow members of a cross-laminated panel, attachable to an edge of the cross-laminated panel.

FIG. 5 shows additional embodiments or styles of the example fitting 112 for providing a chase 400 between openings of hollow members 106 on an edge of the cross-laminated panel 100.

Figure 6:
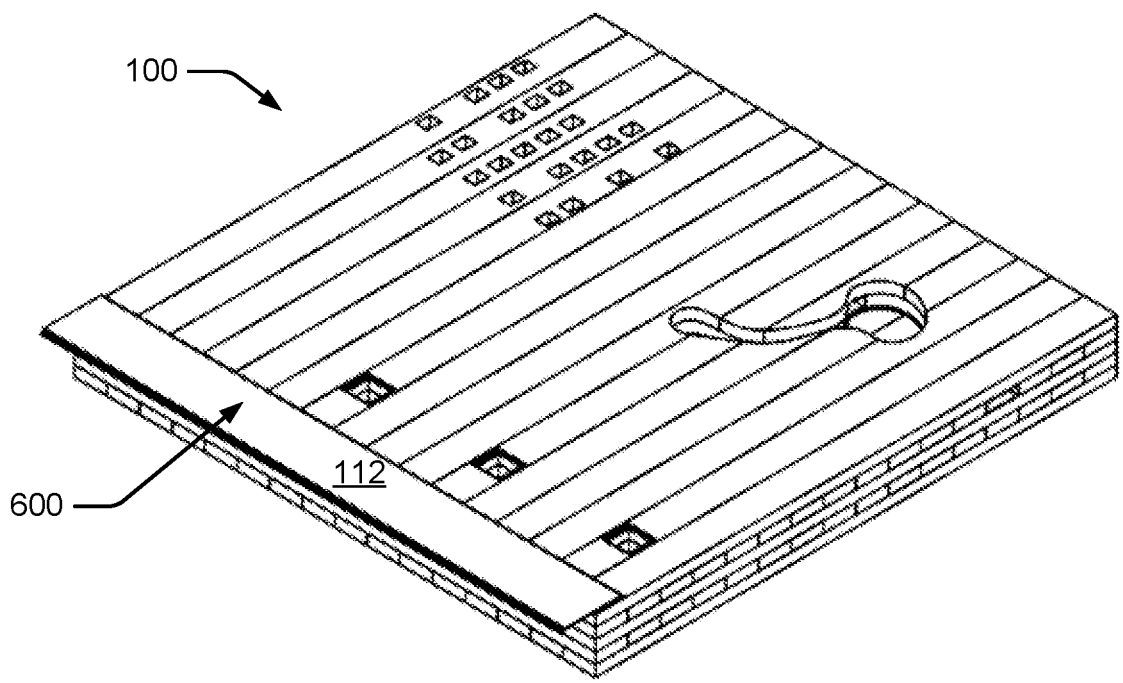
FIG. 6 is a diagram of an oversized or overlapping fitting providing a chase for hollow members of a cross-laminated panel, attachable to an edge of the cross-laminated panel.
Figure 6:
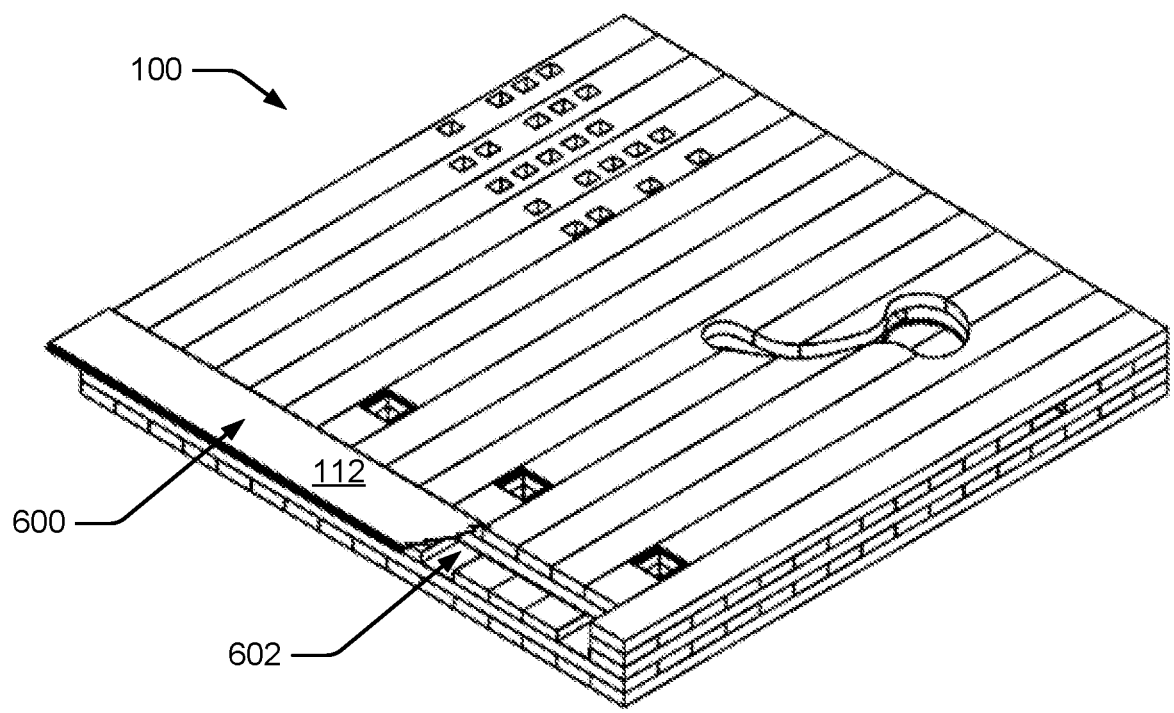

FIG. 6 shows an embodiment 600 of the example fitting 112 that is oversized is some aspects of its geometry or appearance in order to contact or overlap an adjacent cross-laminated panel 100. The adjacent panel can be in the same plane as the shown cross-laminated panel 100, or can be in a different plane, for example, perpendicular to the cross-laminated panel 100. A sectioned view 602 of the example fitting 112 shows an example recessed edge of the cross-laminated panel 100, and shows access to the openings of the hollow members 106 of the cross-laminated panel 100.

Figure 7:
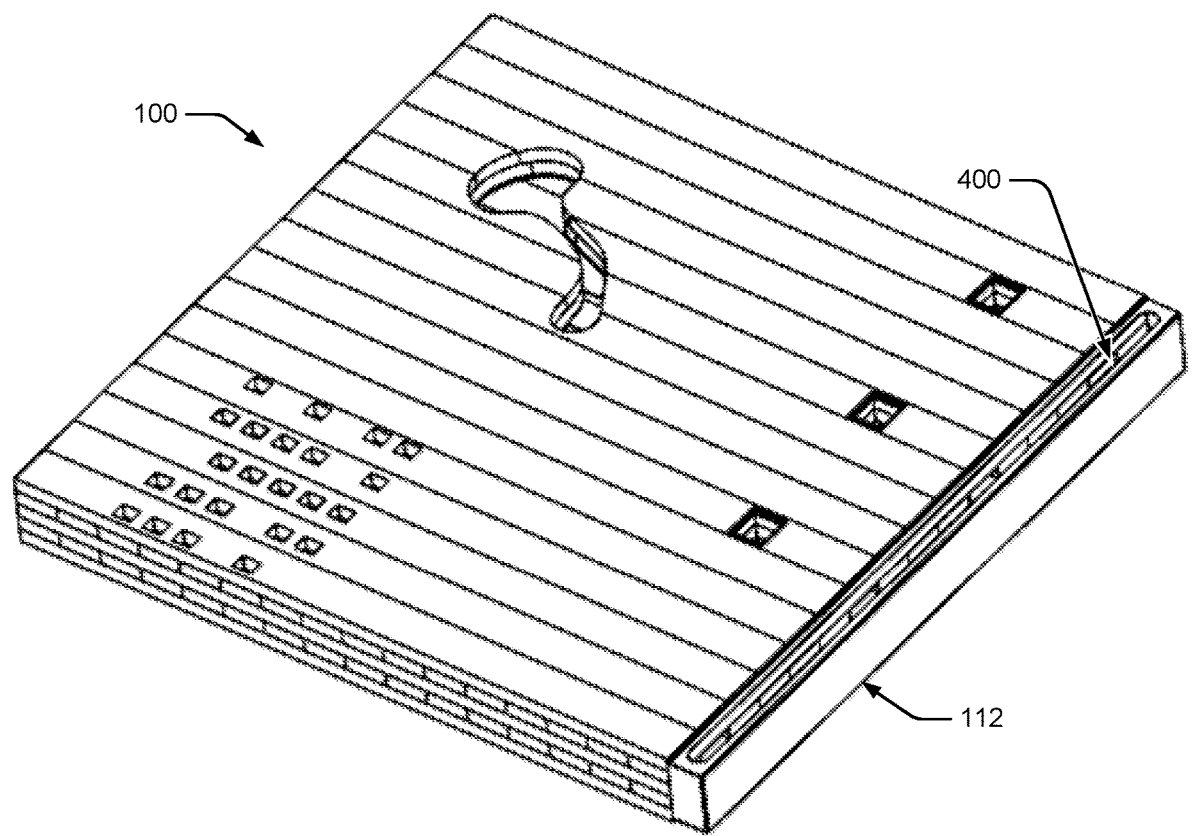
FIG. 7 is a diagram of a fitting providing an accessible chase with optional cover for hollow members of a cross-laminated panel, attachable to an edge of the cross-laminated panel.

FIG. 7 shows an embodiment of the example fitting 112 that allows access to the chase 400 formed by the fitting 112 from a front of the cross-laminated panel 100. The example fitting 112 of FIG. 7 may have an optional cover for the open space of the chase 400. The optional cover may be a utility cover or a decorative piece or cover, such as decorative cover member 2000 in FIG. 20. Or alternatively, the fitting could be designed to itself be cosmetic, therefore not requiring an additional piece. For attachment to the edge of the cross-laminated panel 100, the example fitting 112 of FIG. 7 may optionally use adapters integral to the fitting 112 that fit into the openings 402 of the hollow members 106, such as hollow plugs 2002 in FIG. 20.

Figure 8:
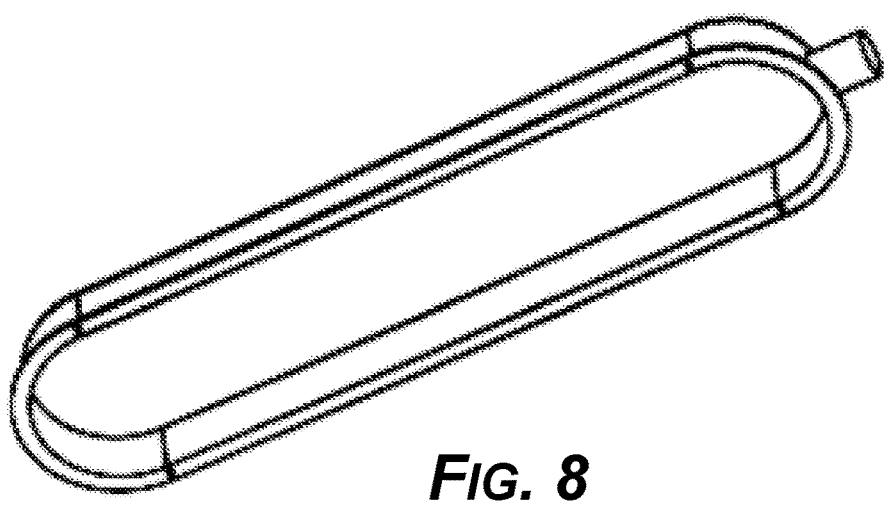
FIG. 8 is a diagram of an alternative embodiment of a fitting providing a chase for hollow members of a cross-laminated panel, attachable to an edge of the cross-laminated panel.
Figure 9:
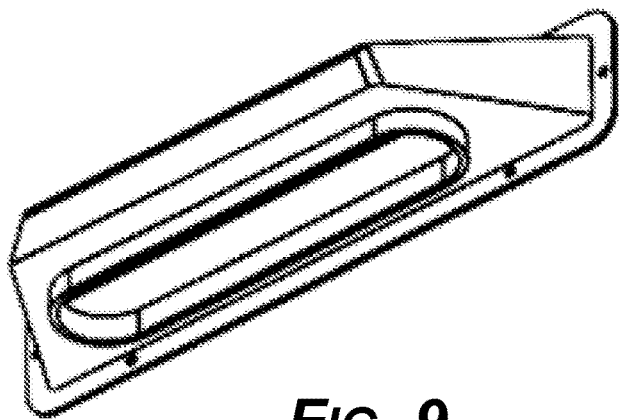
FIG. 9 is a diagram of an alternative embodiment of a fitting providing a chase for hollow members of a cross-laminated panel, attachable to an edge of the cross-laminated panel.
Figure 10:
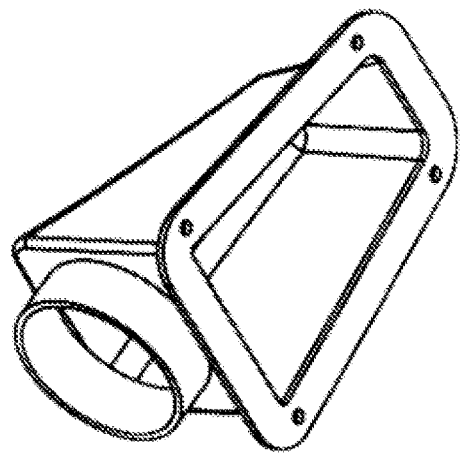
FIG. 10 is a diagram of an alternative embodiment of a fitting providing a chase for hollow members of a cross-laminated panel, attachable to an edge of the cross-laminated panel.

FIGS. 8-10 show different embodiments or styles of the example fitting 112 that may be used on an edge of a given cross-laminated panel 100 to provide a chase 400 for wiring, airflow, plumbing, and so forth between the openings 402 of multiple hollow members 106 of a cross-laminated panel 100. It should be noted that some embodiments of the fittings 112 can be used on the larger surfaces of the cross-laminated panel 100 to intercept or interface with a hollow member 106 via a hole made in a large (front or back) surface of the cross-laminated panel 100, as shown in FIGS. 1-2A, for example.

Figure 11:
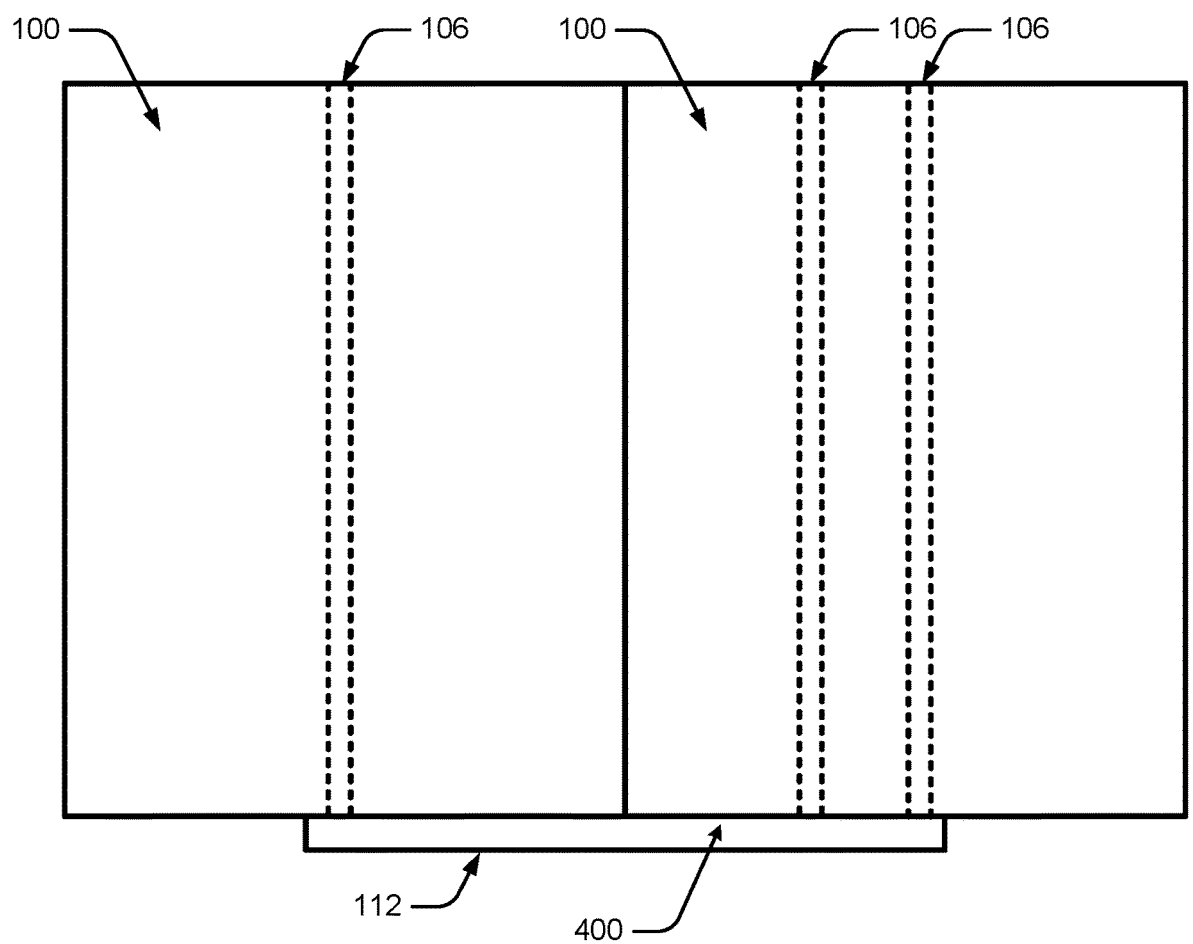
FIG. 11 is a diagram of an example fitting providing a chase for hollow members of two adjacent cross-laminated panels.

FIG. 11 shows an example fitting 112 providing a chase 400 for wiring, airflow, plumbing, and so forth between two adjacent cross-laminated panels, extending at a great enough length as a footer between the cross-laminated panels 100 to provide a common chase 400 for the hollow members 106 of each cross-laminated panel 100. The chase 400 and the hollow bores of the participating hollow members 106 form a routing network of passages that may be customized for a given construction or building project. In an implementation, the cross-laminated panels 100 are manufactured with placement of certain hollow members 106 predetermined by the custom design. In another implementation, the cross-laminated panels 100 are manufactured with a stock pattern or a stock spacing of a given number of the hollow members 106.

Figure 12:
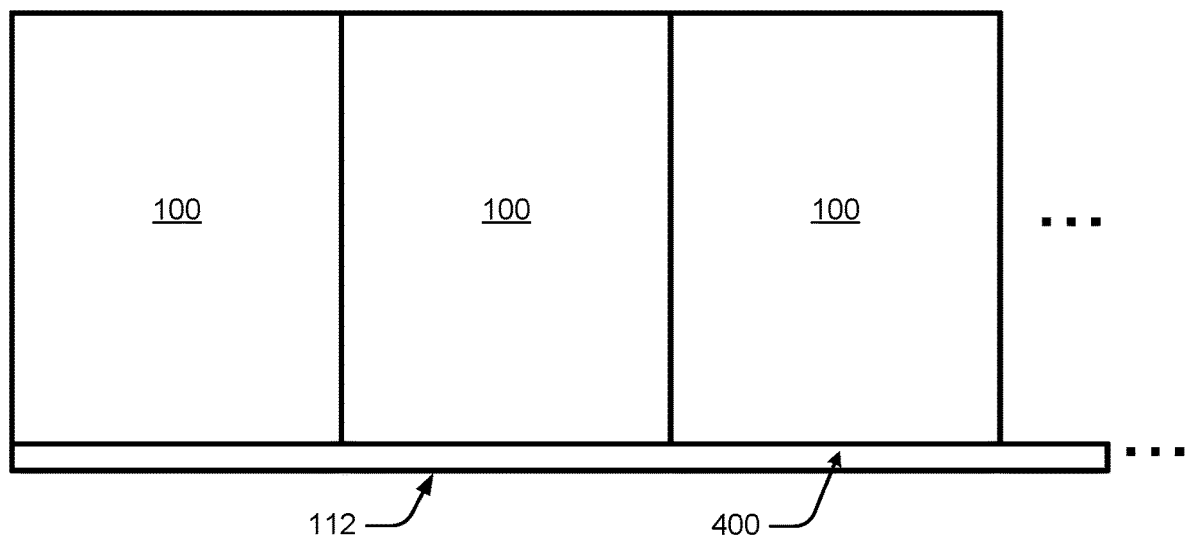
FIG. 12 is a diagram of a fitting extending an entire span of each of multiple cross-laminated panels, providing a chase for hollow members of the multiple cross-laminated panels.

FIG. 12 shows an example fitting 112 providing a common chase 400 for multiple cross-laminated panels 100, extending a full span of each cross-laminated panel 100. The example fitting 112 may be a footer, header, or trim of the cross-laminated panels 100. The use of an example fitting 112 on one edge of a cross-laminated panel 100 does not preclude the use of another instance of an example fitting 112 to provide a chase 400 on one or more other edges of a given cross-laminated panel 100.

Figure 13:
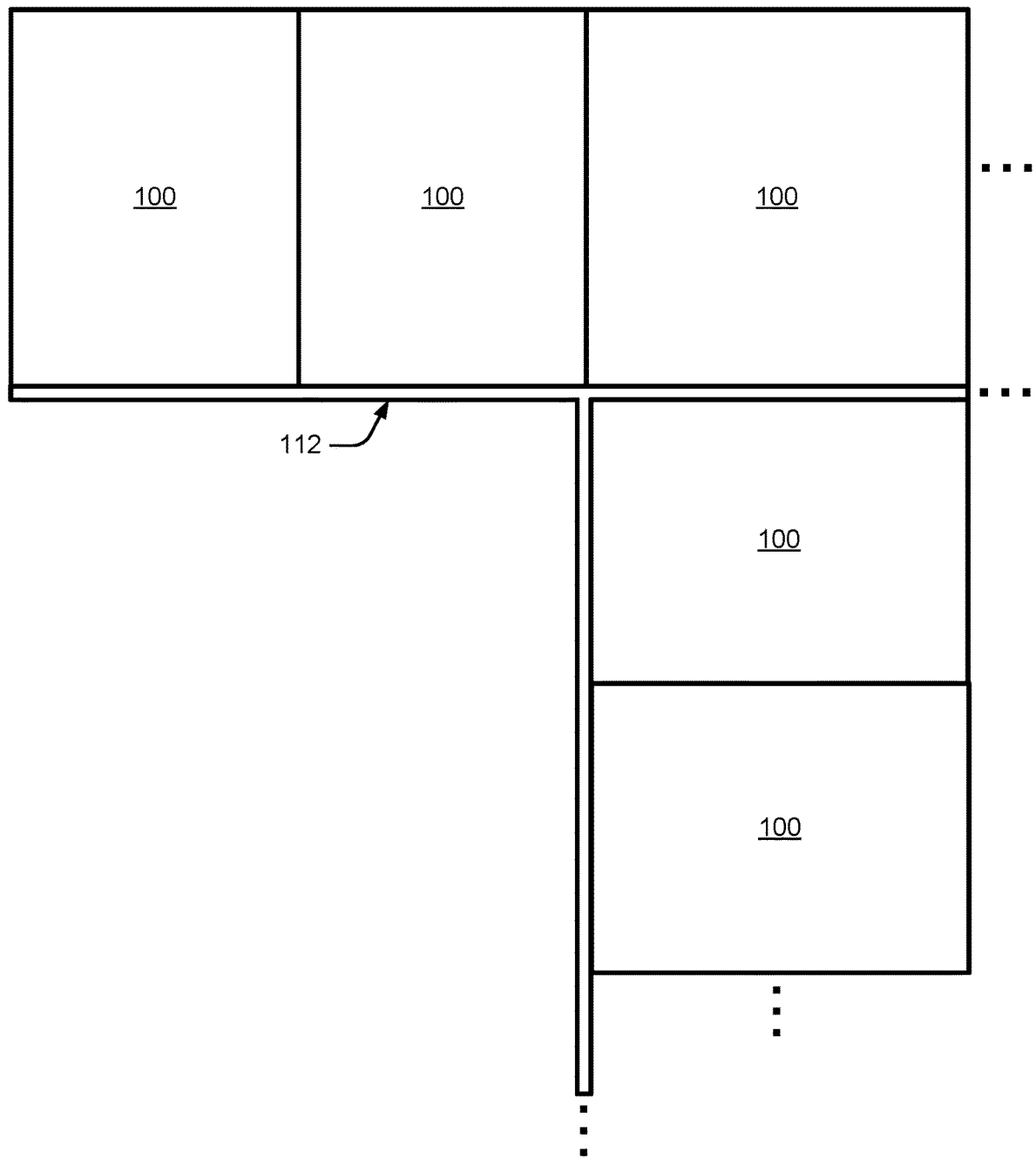
FIG. 13 is a diagram of a fitting providing a chase in two coplanar dimensions for an array of cross-laminated panels.

FIG. 13 shows a series of coplanar cross-laminated panels 100 as might be installed on a wall, but especially on a ceiling or floor. An example fitting 112 provides a common chase 400 for participating hollow members 106 of each cross-laminated panel 100. The example fitting 112 can establish a route in two dimensions of the same plane as the installed cross-laminated panels 100. The example fitting 112 can provide routing for lighting (wires and/or mounting tracks) on a ceiling, or can provide routing for heating tubes or continuous tubing, for example, in a radiant hydronic heating system being installed in flooring. The example fitting 112 provides the advantage of being able to install wiring, plumbing, airflow ducting in a ceiling or floor (or wall), without having to get above the ceiling, or get below the floor, or get behind the wall to install wires, pipes, and ducting, since the example fitting 112 is coplanar with the cross-laminated panels 100 being installed, and the hollow members 106 of the cross-laminated panels 100 are of course coplanar with the cross-laminated panels 100 too, since the hollow members 100 are integral with the cross-laminated panels 100.

Figure 14:
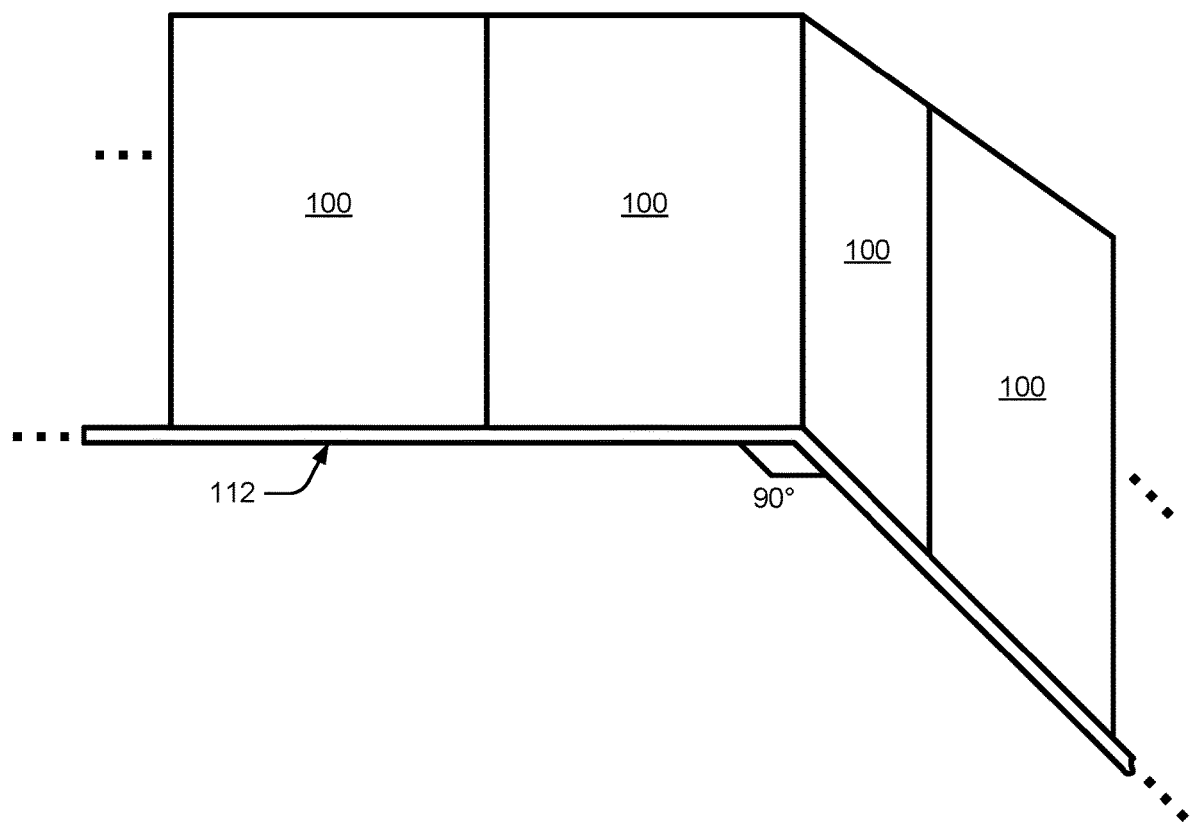
FIG. 14 is a diagram of a fitting providing a chase in two dimensions for cross-laminated panels in two planes.

FIG. 14 shows an example fitting 112 used as a horizontal footer for cross-laminated panels 100 installed in two planes: in this case, forming a corner, with the two planes perpendicular to each other. In an implementation, the example fitting 112 can be styled and manufactured as a baseboard for walls, for example. Likewise, the example fitting 112 can be styled and manufactured as a crown molding (horizontal header) for the cross-laminated panels 100 installed on walls of a room.

Figure 15:
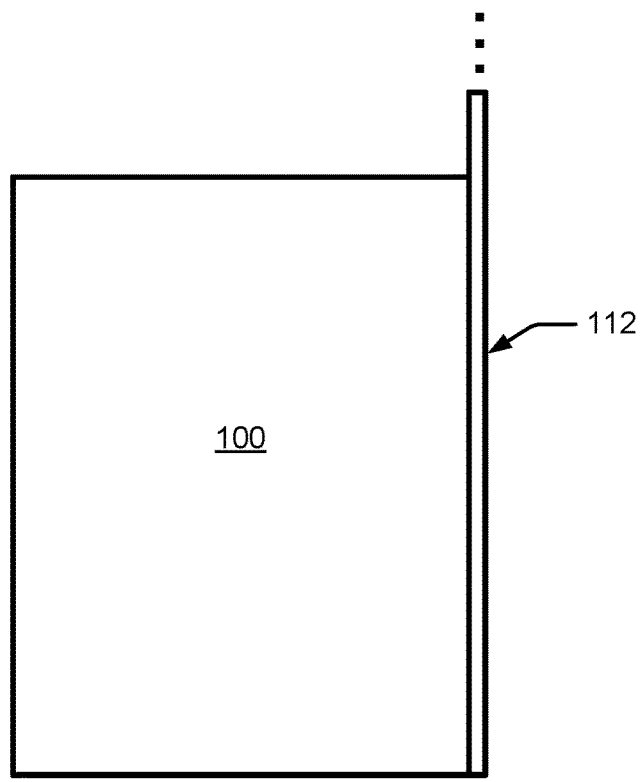
FIG. 15 is a diagram of a fitting providing a vertical chase for hollow members of a single or multiple adjacent cross-laminated panels.
Figure 15:
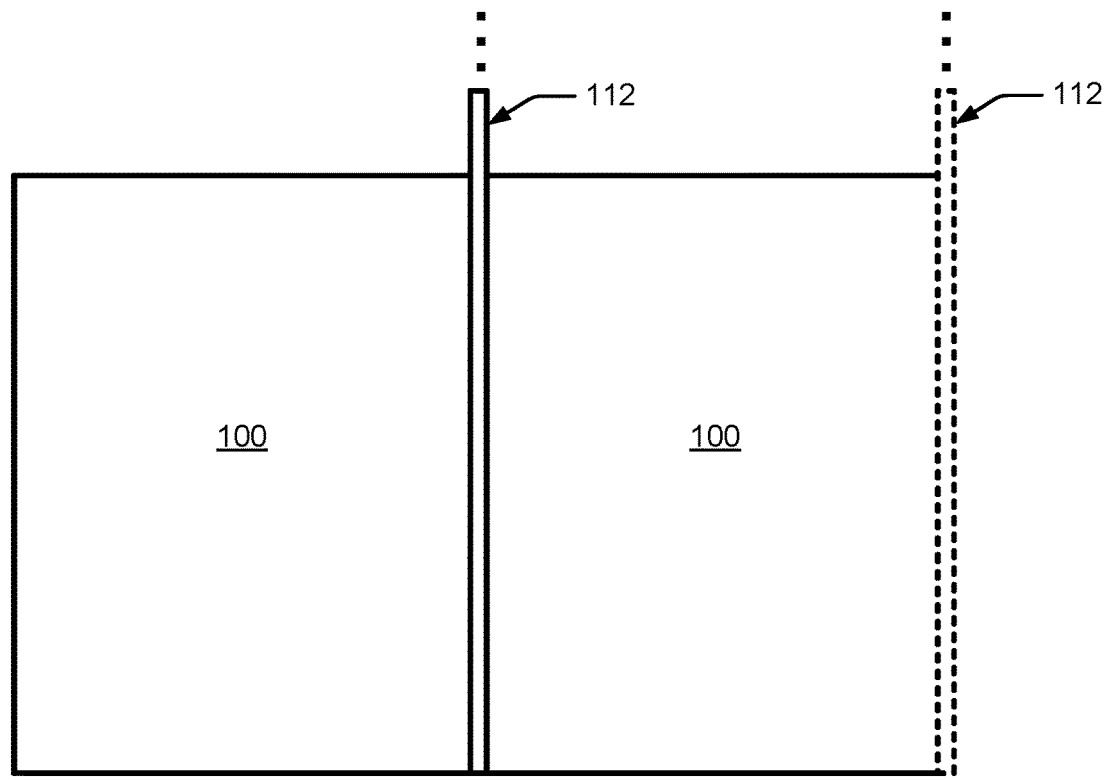

FIG. 15 shows an example fitting 112 used as a vertical chase for one cross-laminated panel 100, or multiple cross-laminated panels 100. In this embodiment, a first side of the fitting 112 is attachable to an edge of a first cross-laminated panel 100, and a second side of the fitting 112 is attachable to an edge of a second cross-laminated panel 100. Thus, the fitting can provide a common vertical chase or a common vertical wiring run that is situated in-between the first cross-laminated panel 100 and the second cross-laminated panel 100 and attached to both when the two cross-laminated panels 100 are disposed in a single flat plane.

Figure 16:
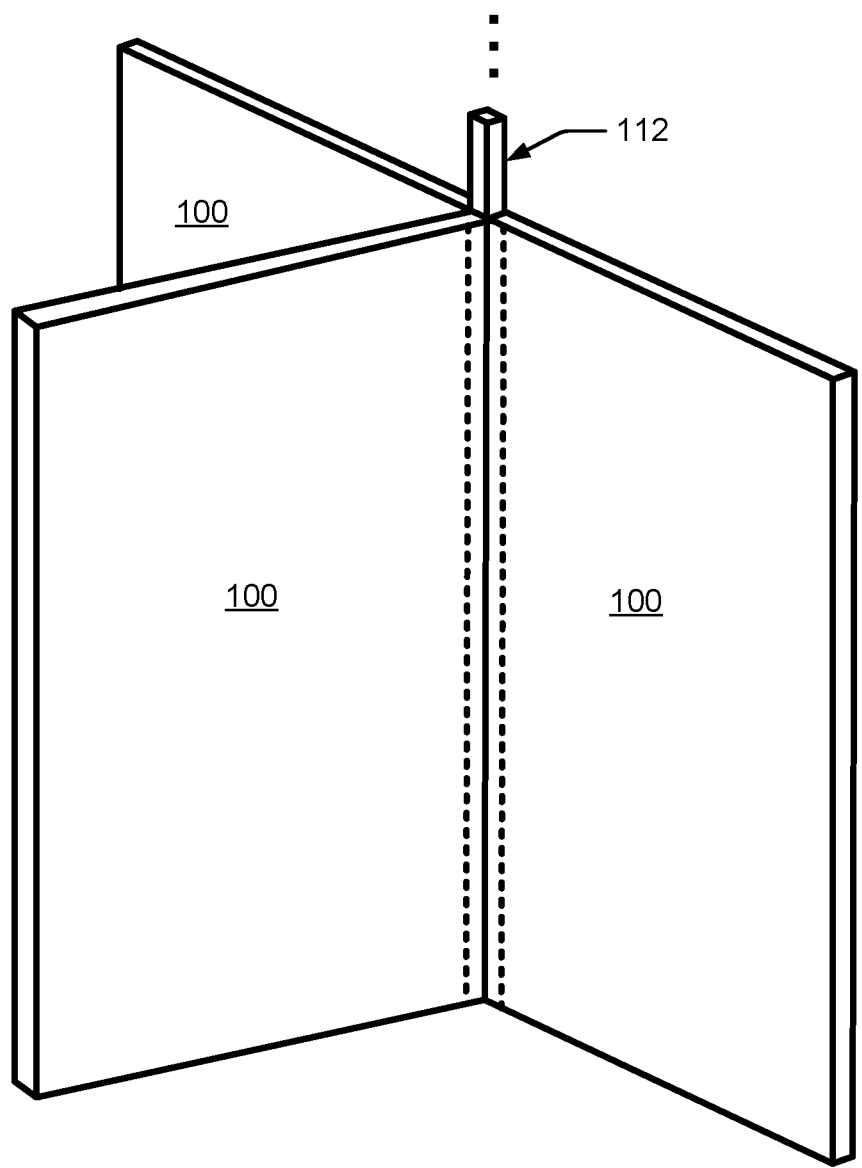
FIG. 16 is a diagram of an example fitting providing a common vertical chase, plumbing space, airflow duct, or a wiring route in communication with hollow members of three cross-laminated panels at an intersection of proximate edges of the three cross-laminated panels installed in two planes.

FIG. 16 shows an example fitting 112 providing a common vertical chase 400, plumbing space, airflow duct, or a wiring route in communication with hollow members 106 of three cross-laminated panels 100 at an intersection of proximate edges of the three cross-laminated panels 100 installed in two planes (not coplanar). The three cross-laminated panels 100 may be installed to form the adjacent corners of two or more rooms in a building, for example. In this embodiment, three different sides of the example fitting 112 are attachable to the respective edges of three different cross-laminated panels 100. Although depicted as being "hidden" by panels in some "rooms," it is understood that the fitting could be larger in dimension (oversized) than the thickness of the panels to allow access to the route or chase in any or all rooms. Alternatively, the shape of the fitting could allow access to the chase or route from any one of/or all of the "rooms."

Figure 17:
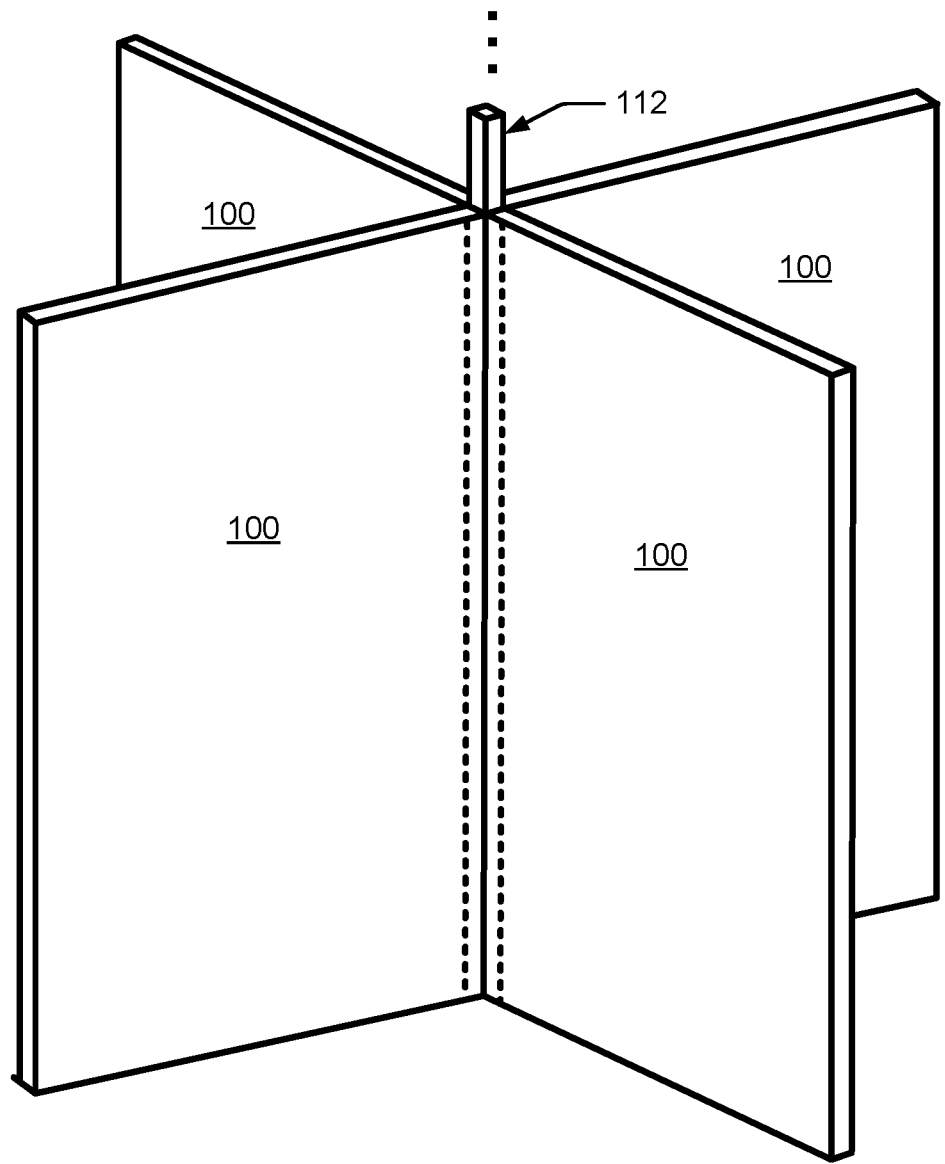
FIG. 17 is a diagram of an example fitting providing a common vertical chase, plumbing space, airflow duct, or a wiring route in communication with hollow members of four cross-laminated panels at an intersection of proximate edges of the four cross-laminated panels installed in two planes.

FIG. 17 shows an example fitting 112 providing a common vertical chase 400, plumbing space, airflow duct, or a wiring route in communication with hollow members 106 of four cross-laminated panels 100 at an intersection of proximate edges of the four cross-laminated panels 100 installed in two planes (not coplanar). The four cross-laminated panels 100 may be installed to form the adjacent corners of four rooms, for example, in a house or building. In this embodiment, the four sides of the example fitting 112 are attachable to the respective edges of four different cross-laminated panels 100. If not desired to access the fitting from the roof or floor system (or top or bottom of the fitting), the fitting could be oversized or shaped appropriately to allow access from any or all of the rooms.

Figure 18:
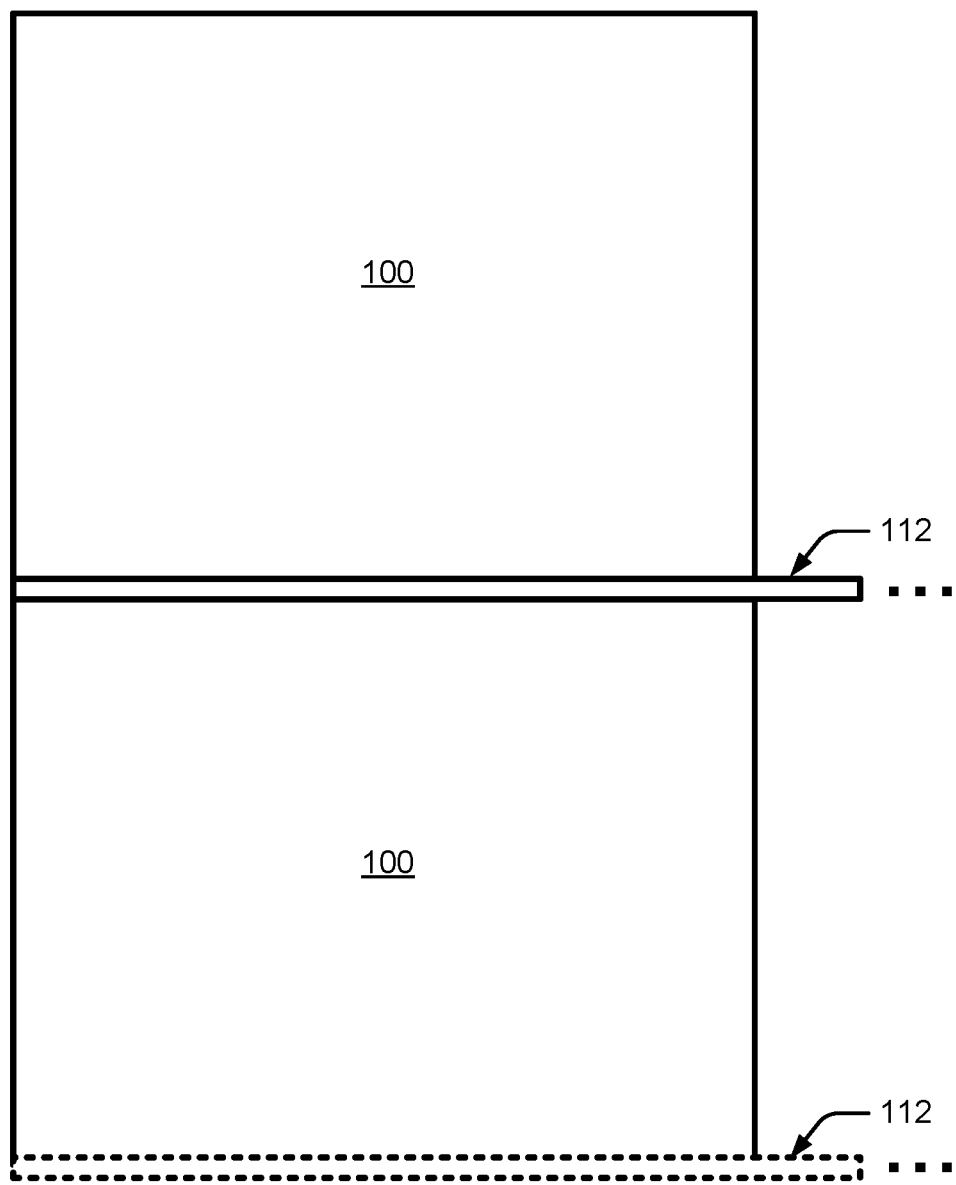
FIG. 18 is a diagram of a fitting providing a horizontal chase for hollow members of a single or multiple adjacent cross-laminated panels.

FIG. 18 shows example fittings 112 installed as common horizontal chases between cross-laminated panels 100. In this configuration, the participating hollow members 106 inside the cross-laminated panels 100 run in a vertical direction. The cross-laminate panels 100 may also have hollow members 106 that run in other directions, that can optionally be connected with a different instance of the example fitting 112, or a version of the same example fitting 112 that runs in two coplanar dimensions (as in FIG. 13). The fitting, while providing access to the hollow members 106 of the panels, may also provide enough structural rigidity to provide the stacking of the panels, and may by itself, or in conjunction with other means of fastening, provide the necessary structural rigidity of the panel to panel attachment to meet the structural requirements of the overall structure.

Figure 19:
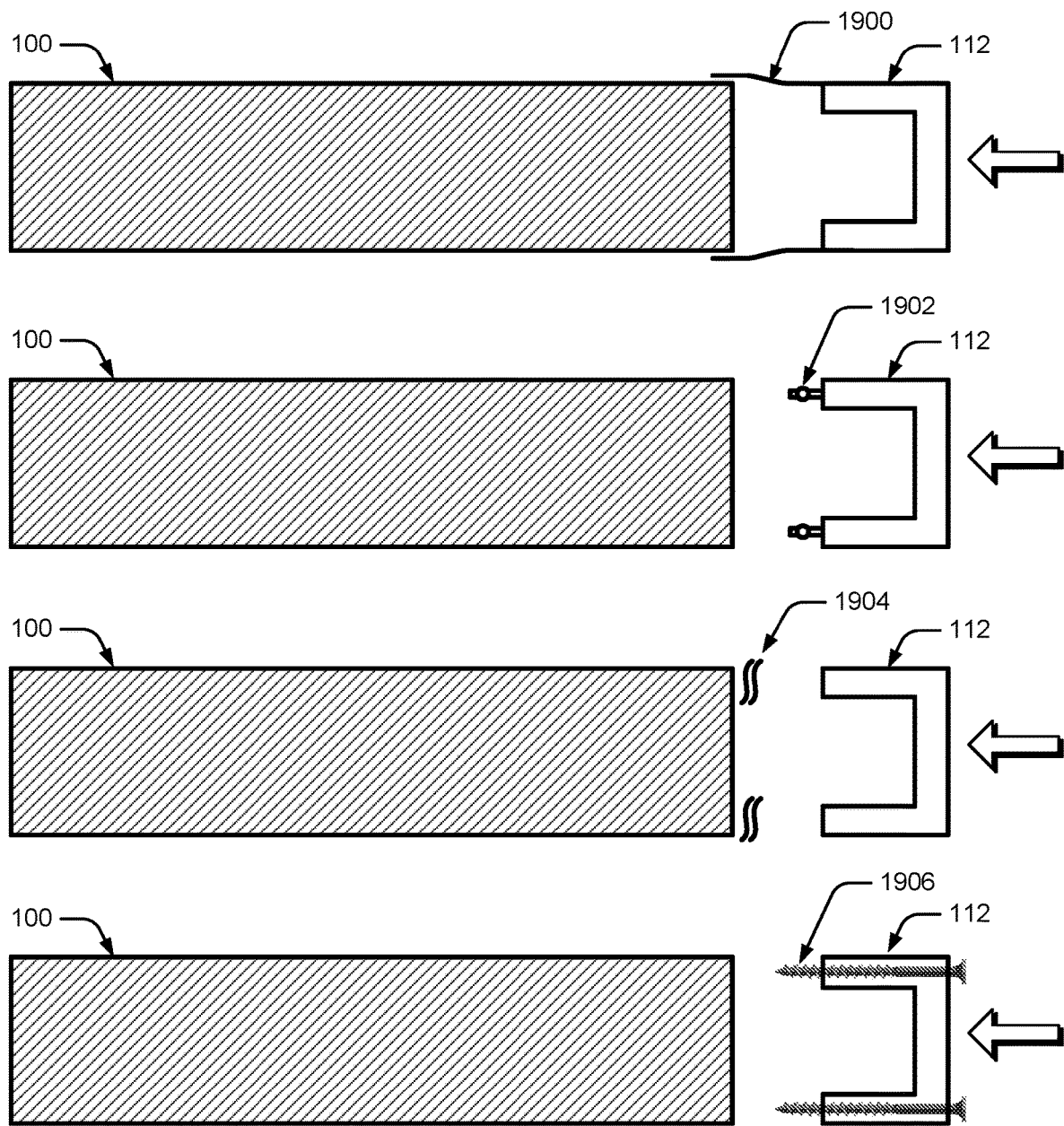
FIG. 19 is a diagram of example methods, devices, and mechanisms for attaching a fixture providing a chase for hollow members of a cross-laminated panel, to an edge of the cross-laminated panel.

FIG. 19 shows various attachment methods and devices, for fastening the example fitting 112 to a given cross-laminated panel 100. In one scenario, the example fitting 112 uses a clip mechanism 1900 or lips, tabs, ridges, etc., of the fitting 112 to attach to the cross-laminated panel 100.

In another scenario, the example fitting 112 uses dowels 1902 to attach to the cross-laminated panel 100 via matching holes created in the edge of the cross-laminated panel 100.

The example fitting 112 may also be attached to the cross-laminated panel 100 with an adhesive 1904. The example fitting 112 may be attached to the cross-laminated panel 100 with other fasteners or fastening devices such as screws 1906 as shown in FIG. 19.

The fastening techniques shown in FIG. 19 do not preclude the use of other known fastening techniques.

Figure 20:
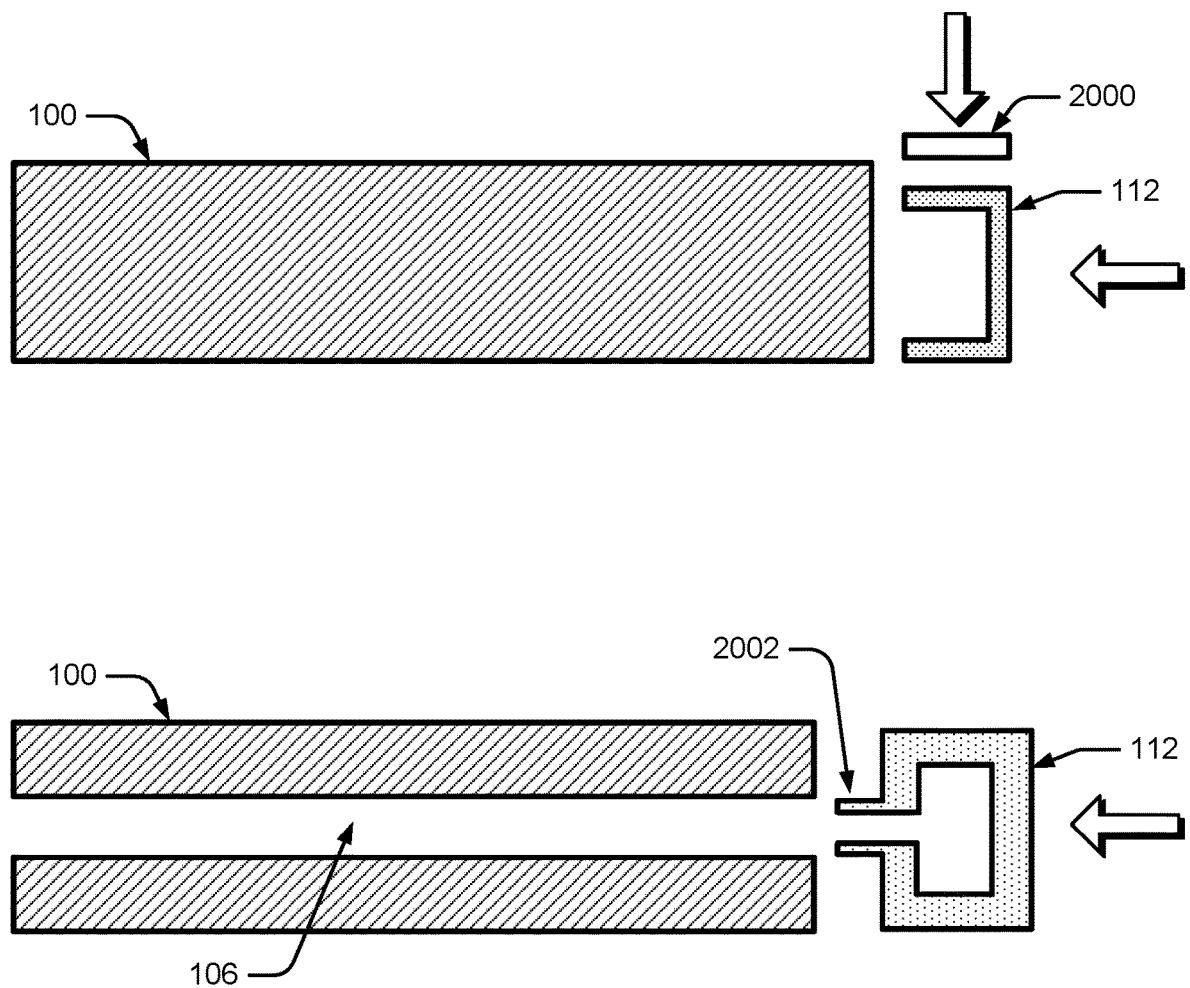
FIG. 20 is a diagram of a fitting providing a chase for a cross-laminated panel, the fitting providing room for a decorative cover member, and of a fitting having adapters or hollow plugs for attaching to openings of hollow members of a cross-laminated panel.

FIG. 20 shows an example fitting 112 having a width that is less than a width of the cross-laminated panel 100. This difference in width allows room for a decorative cover member 2000 to surmount the fitting 112, thereby increasing the width of the fitting 112 and decorative cover member 2000 to equal the width of the cross-laminated panel 100. This configuration can achieve a fitting 112 that is flush with the large front or back surface of the cross-laminated panel 100, while adding a decorative trim appearance, if desired, or just allowing the fitting 112 to blend in with the cross-laminated panel 100 when the decorative cover member 2000 mimics the appearance of the boards of the cross-laminated panel 100. As previously mentioned, the fitting itself may be of cosmetic finish in such that it would not need a decorative cover.

In another method of attachment shown in FIG. 20, the example fitting 112 has integral adapters (or hollow plugs) that match the position of the openings of the hollow members 106 on the edge of the cross-laminated panel 100, for interfacing and plugging-into the openings of the hollow members 106, thereby holding the example fitting 112 in place on the edge of the cross-laminated panel 100. The fitting 112 can have multiple adapters or hollow plugs to interface with and fasten into the openings of multiple corresponding hollow members 106, thereby fastening the fitting 112 securely to the edge of the cross-laminated panel 100.

Although the example fitting 112 is shown as attached to the end of a squared-off cross-laminated panel 100, the cross-laminated panel 100 itself may be manufactured with a machined surface recess to allow improved access to the chase 400 of the fitting 112. The fitting 112 (and its chase 400) may have a removable or hinged access panel or cover (see FIG. 7, for example).

The example fitting 112 can also be a structural member when installing cross-laminated panels 100. The fitting 112 can provide strength and structural integrity, and can even be the structural means for adjoining adjacent cross-laminated panels 100. It should be noted that a given fitting 112 can be installed during manufacture at the factory, or in some implementations, installed in the field.

A given fitting 112 may also have a partitioned chase 400, so that the same fitting 112 can provide separate routing paths for wiring, forced airflow, plumbing, etc. In this configuration, different layers of the cross-laminated panels 100, and each layer's respective hollow members 106, can be reserved for a given utility: wiring, plumbing, air ducting, and so forth.

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

The invention claimed is:

1. A cross-laminated timber panel, comprising:
multiple layers of boards with an adhesive between adjacent layers of the multiple layers;
a first layer of the multiple layers including first solid boards and one or more hollow members, the first solid boards and the one or more hollow members oriented in a first direction, the first solid boards and the one or more hollow members comprising square or rectangular transverse cross-sections having substantially similar exterior dimensions relative to their respective cross-sections;
a second layer of the multiple layers including second solid boards and one or more hollow members, the second solid boards and the one or more hollow members oriented in the first direction, the second solid boards and the one or more hollow members comprising square or rectangular transverse cross-sections having substantially similar exterior dimensions relative to their respective cross-sections;
an additional layer of the multiple layers including additional solid boards, the additional solid boards oriented in a second direction at an angle to the first direction in a plan view, the additional solid boards comprising square or rectangular transverse cross-sections having substantially similar exterior dimensions relative to their respective cross-sections;
wherein each of the one or more hollow members of the first layer and the second layer comprises a hollow transverse cross-section providing a respective conduit;
wherein each of the one or more hollow members of the first layer and the second layer comprises a first end and an opposing second end, each hollow member end at a respective edge of the cross-laminated timber panel, each respective edge including a plurality of hollow member ends across its respective transverse length; and
a fitting attached to at least one respective edge, the fitting spanning the ends of multiple proximate hollow members over only a portion of the respective transverse length forming a continuous routing path.

2. The cross-laminated timber panel of claim 1, wherein the routing path comprises a chase, a plumbing space, an airflow duct, a wiring conduit, or a channel for a fiber optic cable.

3. The cross-laminated timber panel of claim 1, wherein the fitting is directly attached to the respective edge of the cross-laminated timber panel and/or the hollow members spanned by the fitting.

4. The cross-laminated timber panel of claim 1, wherein the fitting comprises one of a plurality of fittings along a respective edge.

5. The cross-laminated timber panel of claim 1, wherein the routing path is substantially parallel to the first direction, extending outward from the edge of the cross-laminated timber panel.

6. The cross-laminated timber panel of claim 1, wherein the routing path is substantially perpendicular to the first direction, extending along the respective edge of the cross-laminated panel.

7. The cross-laminated timber panel of claim 1, wherein the ends of the multiple proximate hollow members are entirely located in the first layer, entirely located in the second layer, or located in both the first and second layers.

8. The cross-laminated timber panel of claim 1, wherein the additional layer is located between the first and second layers.

9. The cross-laminated timber panel of claim 1, wherein the additional layer further includes one or more hollow members oriented in the second direction, the additional solid boards and the one or more hollow members of the additional layer comprising square or rectangular transverse cross-sections having substantially similar exterior dimensions relative to their respective cross-sections.

10. A cross-laminated timber panel, comprising:
multiple layers of boards with an adhesive between adjacent layers of the multiple layers;
a first layer of the multiple layers including first solid boards, the first solid boards oriented in a first direction, the first solid boards comprising square or rectangular transverse cross-sections having substantially similar exterior dimensions relative to their respective cross-sections;

a second layer of the multiple layers including second solid boards, the second solid boards oriented in a second direction at an angle to the first direction in a plan view, the second solid boards comprising square or rectangular transverse cross-sections having substantially similar exterior dimensions relative to their respective cross-sections;

a third layer of the multiple layers including third solid boards, the third solid boards oriented in the first direction, the third solid boards comprising square or rectangular transverse cross-sections having substantially similar exterior dimensions relative to their respective cross-sections;

wherein at least one of the first, second, or third layer further includes multiple hollow members oriented in a same direction as the respective solid boards, the respective solid boards and the multiple hollow members comprising square or rectangular transverse cross-sections having substantially similar exterior dimensions relative to their respective cross-sections;

wherein each of the multiple hollow members of the at least one of the first, second, or third layer comprises a hollow transverse cross-section providing a respective conduit;

wherein each of the multiple hollow members of the at least one of the first, second, or third layer comprises a first end and an opposing second end, each hollow member end at a respective edge of the cross-laminated timber panel, each respective edge including a plurality of hollow member ends across its respective transverse length; and a fitting attached to at least one respective edge, the fitting spanning the ends of multiple proximate hollow members over only a portion of the respective transverse length forming a continuous routing path.

11. The cross-laminated timber panel of claim 10, wherein the multiple proximate hollow members are directly adjacent hollow members.

12. The cross-laminated timber panel of claim 10, wherein the continuous routing path comprises a chase, a plumbing space, an airflow duct, a wiring conduit, or a channel for a fiber optic cable.

13. The cross-laminated timber panel of claim 10, wherein the fitting is directly attached to the respective edge of the cross-laminated timber panel and/or the hollow members spanned by the fitting.

14. The cross-laminated timber panel of claim 10, wherein the fitting comprises one of a plurality of fittings along a respective edge.

15. The cross-laminated timber panel of claim 10, wherein the continuous routing path is substantially parallel to the first direction, extending outward from the edge of the cross-laminated timber panel.

16. The cross-laminated timber panel of claim 10, wherein the continuous routing path is substantially perpendicular to the first direction, extending along the respective edge of the cross-laminated panel.

17. The cross-laminated timber panel of claim 10, wherein the ends of the multiple proximate hollow members are entirely located in the first layer, entirely located in the second layer, or entirely located in the third layer.

18. A cross-laminated timber panel comprising:
multiple layers of boards with an adhesive between adjacent layers of the multiple layers;

a first layer of the multiple layers including first solid boards, the first solid boards oriented in a first direction, the first solid boards comprising square or rectangular transverse cross-sections having substantially similar exterior dimensions relative to their respective cross sections;

a second layer of the multiple layers including second solid boards, the second solid boards oriented in a second direction at an angle to the first direction in a plan view, the second solid boards comprising square or rectangular transverse cross-sections having substantially similar exterior dimensions relative to their respective cross-sections;

a third layer of the multiple layers including third solid boards, the third solid boards oriented in the first direction, the third solid boards comprising square or rectangular transverse cross-sections having substantially similar exterior dimensions relative to their respective cross sections;

wherein the second and/or third layer(s) further include(s) multiple hollow members oriented in a same direction as the respective solid boards, the respective solid boards and the multiple hollow members comprising square or rectangular transverse cross sections having substantiality similar exterior dimensions relative to their respective cross sections;

wherein each of the multiple hollow members of the second and/or third layers comprises a first end and an opposing second end, each hollow member end at a respective edge of the cross-laminated timber panel and multiple access points provided through the first layer of the cross-laminated timber panel, the multiple access points comprising first and second access points provided to access the respective conduit of a same hollow member of the multiple hollow members of the second and/or third layers(s) at locations in the first layer spaced apart in a plan view.

19. The cross-laminated panel of claim 18, wherein the second and third layers each comprise at least one hollow member of the multiple hollow members such that a first hollow member in the second or third layer overlaps a second hollow member in the other of the second or third layer in the plan view, wherein one of the first and second hollow members comprises the same hollow member; and
wherein the first access point is provided to access the respective conduits of both the same hollow member and the other of the first and second hollow members at a location of the overlap and the second access point provided to access only the same hollow member at a different location.

20. The cross-laminated timber panel of claim 18, wherein a fitting is disposed in the at least one access point.

21. The cross-laminated timber panel of claim 20, wherein the fitting comprises an electrical box.

22. The cross-laminated timber panel of claim 18, wherein the at least one access point comprises a hole in a wide face of a hollow member comprising a rectangular transverse cross sections.

23. The cross-laminated timber panel of claim 18, wherein the at least one access point comprises at least one hole in multiple wide faces of multiple hollow members comprising respective rectangular transverse cross sections.

* * * * *